US010984575B2

(12) United States Patent
Assouline et al.

(10) Patent No.: US 10,984,575 B2
(45) Date of Patent: Apr. 20, 2021

(54) BODY POSE ESTIMATION

(71) Applicant: Snap Inc., Santa Monica, CA (US)

(72) Inventors: Avihay Assouline, Tel Aviv (IL);
Itamar Berger, Hod Hasharon (IL);
Yuncheng Li, Los Angeles, CA (US)

(73) Assignee: Snap Inc., Santa Monica, CA (US)

( * ) Notice: Subject to any disclaimer, the term of this patent is extended or adjusted under 35 U.S.C. 154(b) by 0 days.

(21) Appl. No.: 16/269,312

(22) Filed: Feb. 6, 2019

(65) Prior Publication Data

US 2020/0250874 A1 Aug. 6, 2020

(51) Int. Cl.
G06T 13/40 (2011.01)
G06K 9/00 (2006.01)

(52) U.S. Cl.
CPC .......... G06T 13/40 (2013.01); G06K 9/00375 (2013.01)

(58) Field of Classification Search
CPC ..................................... G06T 13/40
USPC .......................................... 345/474
See application file for complete search history.

(56) References Cited

U.S. PATENT DOCUMENTS

| 5,880,731 | A | 3/1999 | Liles et al. |
| 6,020,891 | A | 2/2000 | Rekimoto |
| 6,023,270 | A | 2/2000 | Brush, II et al. |
| 6,038,295 | A | 3/2000 | Mattes |
| 6,223,165 | B1 | 4/2001 | Lauffer |
| 6,772,195 | B1 | 8/2004 | Hatlelid et al. |
| 6,842,779 | B1 | 1/2005 | Nishizawa |
| 6,980,909 | B2 | 12/2005 | Root et al. |
| 7,173,651 | B1 | 2/2007 | Knowles |
| 7,342,587 | B2 | 3/2008 | Danzig et al. |
| 7,411,493 | B2 | 8/2008 | Smith |
| 7,468,729 | B1 | 12/2008 | Levinson |
| 7,535,890 | B2 | 5/2009 | Rojas |

(Continued)

FOREIGN PATENT DOCUMENTS

| CA | 2887596 A1 | 7/2015 |
| CN | 109863532 A | 6/2019 |

(Continued)

OTHER PUBLICATIONS

"International Application Serial No. PCT/US2020/017006, Invitation to Pay Additional Fees dated Jun. 2, 2020", 13 pgs.

(Continued)

Primary Examiner — Shivang I Patel
(74) Attorney, Agent, or Firm — Schwegman Lundberg & Woessner, P.A.

(57) ABSTRACT

Aspects of the present disclosure involve a system comprising a computer-readable storage medium storing a program and a method for detecting a pose of a user. The program and method include receiving a monocular image that includes a depiction of a body of a user; detecting a plurality of skeletal joints of the body depicted in the monocular image; and determining a pose represented by the body depicted in the monocular image based on the detected plurality of skeletal joints of the body. A pose of an avatar is modified to match the pose represented by the body depicted in the monocular image by adjusting a set of skeletal joints of a rig of an avatar based on the detected plurality of skeletal joints of the body; and the avatar having the modified pose that matches the pose represented by the body depicted in the monocular image is generated for display.

19 Claims, 14 Drawing Sheets

(56) References Cited

U.S. PATENT DOCUMENTS

| | | |
|---|---|---|
| 7,636,755 B2 | 12/2009 | Blattner et al. |
| 7,639,251 B2 | 12/2009 | Gu et al. |
| 7,775,885 B2 | 8/2010 | Van Luchene et al. |
| 7,859,551 B2 | 12/2010 | Bulman et al. |
| 7,885,931 B2 | 2/2011 | Seo et al. |
| 7,925,703 B2 | 4/2011 | Dinan et al. |
| 8,088,044 B2 | 1/2012 | Tchao et al. |
| 8,095,878 B2 | 1/2012 | Bates et al. |
| 8,108,774 B2 | 1/2012 | Finn et al. |
| 8,117,281 B2 | 2/2012 | Robinson et al. |
| 8,130,219 B2 | 3/2012 | Fleury et al. |
| 8,131,597 B2 | 3/2012 | Hudetz et al. |
| 8,146,005 B2 | 3/2012 | Jones et al. |
| 8,151,191 B2 | 4/2012 | Nicol |
| 8,199,747 B2 | 6/2012 | Rojas et al. |
| 8,332,475 B2 | 12/2012 | Rosen et al. |
| 8,384,719 B2 | 2/2013 | Reville et al. |
| RE44,054 E | 3/2013 | Kim |
| 8,396,708 B2 | 3/2013 | Park et al. |
| 8,425,322 B2 | 4/2013 | Gillo et al. |
| 8,458,601 B2 | 6/2013 | Castelli et al. |
| 8,462,198 B2 | 6/2013 | Lin et al. |
| 8,484,158 B2 | 7/2013 | Deluca et al. |
| 8,495,503 B2 | 7/2013 | Brown et al. |
| 8,495,505 B2 | 7/2013 | Smith et al. |
| 8,504,926 B2 | 8/2013 | Wolf |
| 8,559,980 B2 | 10/2013 | Pujol |
| 8,564,621 B2 | 10/2013 | Branson et al. |
| 8,564,710 B2 | 10/2013 | Nonaka et al. |
| 8,581,911 B2 | 11/2013 | Becker et al. |
| 8,597,121 B2 | 12/2013 | del Valle |
| 8,601,051 B2 | 12/2013 | Wang |
| 8,601,379 B2 | 12/2013 | Marks et al. |
| 8,632,408 B2 | 1/2014 | Gillo et al. |
| 8,648,865 B2 | 2/2014 | Dawson et al. |
| 8,659,548 B2 | 2/2014 | Hildreth |
| 8,683,354 B2 | 3/2014 | Khandelwal et al. |
| 8,692,830 B2 | 4/2014 | Nelson et al. |
| 8,718,333 B2 | 5/2014 | Wolf et al. |
| 8,724,622 B2 | 5/2014 | Rojas |
| 8,730,156 B2 | 5/2014 | Weising et al. |
| 8,810,513 B2 | 8/2014 | Ptucha et al. |
| 8,812,171 B2 | 8/2014 | Filev et al. |
| 8,832,201 B2 | 9/2014 | Wall |
| 8,832,552 B2 | 9/2014 | Arrasvuori et al. |
| 8,839,327 B2 | 9/2014 | Amento et al. |
| 8,874,677 B2 | 10/2014 | Rosen et al. |
| 8,890,926 B2 | 11/2014 | Tandon et al. |
| 8,892,999 B2 | 11/2014 | Nims et al. |
| 8,909,679 B2 | 12/2014 | Root et al. |
| 8,924,250 B2 | 12/2014 | Bates et al. |
| 8,963,926 B2 | 2/2015 | Brown et al. |
| 8,989,786 B2 | 3/2015 | Feghali |
| 8,995,433 B2 | 3/2015 | Rojas |
| 9,040,574 B2 | 5/2015 | Wang et al. |
| 9,055,416 B2 | 6/2015 | Rosen et al. |
| 9,086,776 B2 | 7/2015 | Ye et al. |
| 9,100,806 B2 | 8/2015 | Rosen et al. |
| 9,100,807 B2 | 8/2015 | Rosen et al. |
| 9,105,014 B2 | 8/2015 | Collet et al. |
| 9,191,776 B2 | 11/2015 | Root et al. |
| 9,204,252 B2 | 12/2015 | Root |
| 9,241,184 B2 | 1/2016 | Weerasinghe |
| 9,256,860 B2 | 2/2016 | Herger et al. |
| 9,298,257 B2 | 3/2016 | Hwang et al. |
| 9,314,692 B2 | 4/2016 | Konoplev et al. |
| 9,330,483 B2 | 5/2016 | Du et al. |
| 9,357,174 B2 | 5/2016 | Li et al. |
| 9,361,510 B2 | 6/2016 | Yao et al. |
| 9,378,576 B2 | 6/2016 | Bouaziz et al. |
| 9,402,057 B2 | 7/2016 | Kaytaz et al. |
| 9,412,192 B2 | 8/2016 | Mandel et al. |
| 9,443,227 B2 | 9/2016 | Evans et al. |
| 9,460,541 B2 | 10/2016 | Li et al. |
| 9,489,760 B2 | 11/2016 | Li et al. |
| 9,491,134 B2 | 11/2016 | Rosen et al. |
| 9,503,845 B2 | 11/2016 | Vincent |
| 9,508,197 B2 | 11/2016 | Quinn et al. |
| 9,517,403 B1 | 12/2016 | Kim et al. |
| 9,544,257 B2 | 1/2017 | Ogundokun et al. |
| 9,576,400 B2 | 2/2017 | Van Os et al. |
| 9,589,357 B2 | 3/2017 | Li et al. |
| 9,592,449 B2 | 3/2017 | Barbalet et al. |
| 9,633,447 B2 | 4/2017 | Swaminathan et al. |
| 9,645,394 B2 | 5/2017 | Kinnebrew et al. |
| 9,648,376 B2 | 5/2017 | Chang et al. |
| 9,652,897 B2 | 5/2017 | Osborn et al. |
| 9,697,635 B2 | 7/2017 | Quinn et al. |
| 9,706,040 B2 | 7/2017 | Kadirvel et al. |
| 9,744,466 B2 | 8/2017 | Fujioka |
| 9,746,990 B2 | 8/2017 | Anderson et al. |
| 9,749,270 B2 | 8/2017 | Collet et al. |
| 9,792,714 B2 | 10/2017 | Li et al. |
| 9,839,844 B2 | 12/2017 | Dunstan et al. |
| 9,883,838 B2 | 2/2018 | Kaleal, III et al. |
| 9,898,849 B2 | 2/2018 | Du et al. |
| 9,911,073 B1 | 3/2018 | Spiegel et al. |
| 9,936,165 B2 | 4/2018 | Li et al. |
| 9,959,037 B2 | 5/2018 | Chaudhri et al. |
| 9,980,100 B1 | 5/2018 | Charlton et al. |
| 9,990,373 B2 | 6/2018 | Fortkort |
| 10,039,988 B2 | 8/2018 | Lobb et al. |
| 10,097,492 B2 | 10/2018 | Tsuda et al. |
| 10,116,598 B2 | 10/2018 | Tucker et al. |
| 10,155,168 B2 | 12/2018 | Blackstock et al. |
| 10,173,141 B1 | 1/2019 | Schindler et al. |
| 10,242,477 B1 | 3/2019 | Charlton et al. |
| 10,242,503 B2 | 3/2019 | McPhee et al. |
| 10,262,250 B1 | 4/2019 | Spiegel et al. |
| 10,362,219 B2 | 7/2019 | Wilson et al. |
| 10,475,225 B2 | 11/2019 | Park et al. |
| 10,504,266 B2 | 12/2019 | Blattner et al. |
| 10,573,048 B2 | 2/2020 | Ni et al. |
| 10,657,701 B2 | 5/2020 | Osman et al. |
| 10,740,978 B2 | 8/2020 | McPhee et al. |
| 2002/0067362 A1 | 6/2002 | Agostino Nocera et al. |
| 2002/0169644 A1 | 11/2002 | Greene |
| 2004/0212630 A1 | 10/2004 | Hobgood et al. |
| 2005/0041842 A1 | 2/2005 | Frakes et al. |
| 2005/0162419 A1 | 7/2005 | Kim et al. |
| 2005/0206610 A1 | 9/2005 | Cordelli |
| 2006/0294465 A1 | 12/2006 | Ronen et al. |
| 2007/0113181 A1 | 5/2007 | Blattner et al. |
| 2007/0168863 A1 | 7/2007 | Blattner et al. |
| 2007/0176921 A1 | 8/2007 | Iwasaki et al. |
| 2008/0078758 A1 | 4/2008 | Shimura et al. |
| 2008/0158222 A1 | 7/2008 | Li et al. |
| 2009/0016617 A1 | 1/2009 | Bregman-amitai et al. |
| 2009/0055484 A1 | 2/2009 | Vuong et al. |
| 2009/0070688 A1 | 3/2009 | Gyorfi et al. |
| 2009/0099925 A1 | 4/2009 | Mehta et al. |
| 2009/0106672 A1 | 4/2009 | Burstrom |
| 2009/0158170 A1 | 6/2009 | Narayanan et al. |
| 2009/0160779 A1 | 6/2009 | Crockett et al. |
| 2009/0177976 A1 | 7/2009 | Bokor et al. |
| 2009/0202114 A1 | 8/2009 | Morin et al. |
| 2009/0265604 A1 | 10/2009 | Howard et al. |
| 2009/0300525 A1 | 12/2009 | Jolliff et al. |
| 2009/0303984 A1 | 12/2009 | Clark et al. |
| 2010/0011422 A1 | 1/2010 | Mason et al. |
| 2010/0023885 A1 | 1/2010 | Reville et al. |
| 2010/0115426 A1 | 5/2010 | Liu et al. |
| 2010/0162141 A1 | 6/2010 | Koch et al. |
| 2010/0203968 A1 | 8/2010 | Gill et al. |
| 2010/0227682 A1 | 9/2010 | Reville et al. |
| 2010/0251101 A1 | 9/2010 | Haussecker et al. |
| 2011/0093780 A1 | 4/2011 | Dunn |
| 2011/0115798 A1 | 5/2011 | Nayar et al. |
| 2011/0148864 A1 | 6/2011 | Lee et al. |
| 2011/0161242 A1 | 6/2011 | Chung et al. |
| 2011/0183732 A1 | 7/2011 | Block et al. |
| 2011/0202598 A1 | 8/2011 | Evans et al. |
| 2011/0239136 A1 | 9/2011 | Goldman et al. |
| 2012/0113106 A1 | 5/2012 | Choi et al. |

(56) References Cited

U.S. PATENT DOCUMENTS

| | | |
|---|---|---|
| 2012/0124458 A1 | 5/2012 | Cruzada |
| 2012/0130717 A1 | 5/2012 | Xu et al. |
| 2012/0194549 A1 | 8/2012 | Osterhout et al. |
| 2012/0209924 A1 | 8/2012 | Evans et al. |
| 2013/0021373 A1 | 1/2013 | Vaught et al. |
| 2013/0050258 A1 | 2/2013 | Liu et al. |
| 2013/0103760 A1 | 4/2013 | Golding et al. |
| 2013/0127980 A1 | 5/2013 | Haddick et al. |
| 2013/0141434 A1 | 6/2013 | Sugden et al. |
| 2013/0201187 A1 | 8/2013 | Tong et al. |
| 2013/0249948 A1 | 9/2013 | Reitan |
| 2013/0257877 A1 | 10/2013 | Davis |
| 2013/0278631 A1 | 10/2013 | Border et al. |
| 2014/0028713 A1 | 1/2014 | Keating et al. |
| 2014/0043329 A1 | 2/2014 | Wang et al. |
| 2014/0055554 A1 | 2/2014 | Du et al. |
| 2014/0078176 A1 | 3/2014 | Kim et al. |
| 2014/0125678 A1 | 5/2014 | Wang et al. |
| 2014/0129343 A1 | 5/2014 | Finster et al. |
| 2014/0176608 A1 | 6/2014 | Boysen et al. |
| 2014/0321702 A1 | 10/2014 | Schmalstieg |
| 2014/0351758 A1 | 11/2014 | Yoshida |
| 2015/0042663 A1* | 2/2015 | Mandel .................. G06T 13/80 345/474 |
| 2015/0098614 A1 | 4/2015 | Gee et al. |
| 2015/0206349 A1 | 7/2015 | Rosenthal et al. |
| 2015/0262029 A1 | 9/2015 | Pirchheim et al. |
| 2015/0264304 A1 | 9/2015 | Chastney et al. |
| 2015/0269783 A1 | 9/2015 | Yun |
| 2015/0371447 A1* | 12/2015 | Yasutake ............... G06T 19/006 345/420 |
| 2016/0025978 A1 | 1/2016 | Mallinson |
| 2016/0063600 A1 | 3/2016 | Wuang |
| 2016/0109940 A1 | 4/2016 | Lyren et al. |
| 2016/0134840 A1 | 5/2016 | Mcculloch |
| 2016/0171739 A1 | 6/2016 | Anderson et al. |
| 2016/0234149 A1 | 8/2016 | Tsuda et al. |
| 2016/0330522 A1 | 11/2016 | Newell et al. |
| 2016/0360115 A1 | 12/2016 | Rim |
| 2017/0038829 A1 | 2/2017 | Lanier et al. |
| 2017/0039986 A1 | 2/2017 | Lanier et al. |
| 2017/0069134 A1 | 3/2017 | Shapira et al. |
| 2017/0080346 A1 | 3/2017 | Abbas |
| 2017/0087473 A1 | 3/2017 | Siegel et al. |
| 2017/0090747 A1 | 3/2017 | Dash |
| 2017/0113140 A1 | 4/2017 | Blackstock et al. |
| 2017/0118145 A1 | 4/2017 | Aittoniemi et al. |
| 2017/0178272 A1 | 6/2017 | Lashkari et al. |
| 2017/0199855 A1 | 7/2017 | Fishbeck |
| 2017/0221272 A1 | 8/2017 | Li et al. |
| 2017/0229153 A1 | 8/2017 | Moore et al. |
| 2017/0235848 A1 | 8/2017 | Van Dusen et al. |
| 2017/0255450 A1 | 9/2017 | Mullins et al. |
| 2017/0287060 A1 | 10/2017 | Choi et al. |
| 2017/0310934 A1 | 10/2017 | Du et al. |
| 2017/0312634 A1 | 11/2017 | Ledoux et al. |
| 2017/0329488 A1 | 11/2017 | Welker et al. |
| 2017/0361225 A1 | 12/2017 | Goslin et al. |
| 2018/0040166 A1 | 2/2018 | Jayaraj et al. |
| 2018/0047200 A1 | 2/2018 | O'hara et al. |
| 2018/0061072 A1 | 3/2018 | Benezra et al. |
| 2018/0082430 A1 | 3/2018 | Sharma et al. |
| 2018/0108179 A1 | 4/2018 | Tomlin et al. |
| 2018/0113587 A1 | 4/2018 | Allen et al. |
| 2018/0114365 A1 | 4/2018 | Egri et al. |
| 2018/0115503 A1 | 4/2018 | Baldwin et al. |
| 2018/0143950 A1 | 5/2018 | Al-amaouti et al. |
| 2018/0197343 A1 | 7/2018 | Hare et al. |
| 2018/0210628 A1 | 7/2018 | Mcphee et al. |
| 2018/0285647 A1 | 10/2018 | Chen et al. |
| 2018/0315076 A1 | 11/2018 | Andreou |
| 2018/0315133 A1 | 11/2018 | Brody et al. |
| 2018/0315134 A1 | 11/2018 | Amitay et al. |
| 2018/0349451 A1 | 12/2018 | O'connell et al. |
| 2019/0001223 A1 | 1/2019 | Blackstock et al. |
| 2019/0004688 A1 | 1/2019 | Bowen |
| 2019/0011703 A1 | 1/2019 | Robaina et al. |
| 2019/0057616 A1 | 2/2019 | Cohen et al. |
| 2019/0107991 A1 | 4/2019 | Spivack et al. |
| 2019/0188920 A1 | 6/2019 | Mcphee et al. |
| 2019/0304189 A1 | 10/2019 | Falstrup et al. |
| 2019/0385378 A1 | 12/2019 | Bastian et al. |
| 2020/0066014 A1 | 2/2020 | Mehta et al. |
| 2020/0074738 A1 | 3/2020 | Hare et al. |
| 2020/0105006 A1 | 4/2020 | Karsch et al. |
| 2020/0202632 A1 | 6/2020 | Goodrich et al. |
| 2020/0327734 A1 | 10/2020 | Goodrich et al. |

FOREIGN PATENT DOCUMENTS

| | | |
|---|---|---|
| CN | 110168478 A | 8/2019 |
| EP | 2184092 A2 | 5/2010 |
| JP | 2001230801 A | 8/2001 |
| JP | 5497931 B2 | 3/2014 |
| KR | 101445263 B1 | 9/2014 |
| WO | WO-2003094072 A1 | 11/2003 |
| WO | WO-2004095308 A1 | 11/2004 |
| WO | WO-2006107182 A1 | 10/2006 |
| WO | WO-2007134402 A1 | 11/2007 |
| WO | WO-2012139276 A1 | 10/2012 |
| WO | WO-2013027893 A1 | 2/2013 |
| WO | WO-2013152454 A1 | 10/2013 |
| WO | WO-2013166588 A1 | 11/2013 |
| WO | WO-2014031899 A1 | 2/2014 |
| WO | WO-2014194439 A1 | 12/2014 |
| WO | WO-2018081013 A1 | 5/2016 |
| WO | WO-2016090605 A1 | 6/2016 |
| WO | WO-2018102562 A1 | 6/2018 |
| WO | WO-2015129531 | 7/2018 |
| WO | WO-2018129531 A1 | 7/2018 |
| WO | WO-2019189613 A1 | 5/2019 |
| WO | WO-2020047117 A1 | 3/2020 |
| WO | WO-2020132541 A1 | 6/2020 |
| WO | 2020163592 | 8/2020 |

OTHER PUBLICATIONS

"Skeletal animation", Wikipedia, [Online] Retrieved from the Internet: <URL: https://en.wikipedia.org/index.php?title=Skeletal_animation&oldid=694599494>, (Dec. 10, 2015), 3 pgs.

"International Application Serial No. PCT/US2020/017006, International Search Report dated Jul. 30, 2020", 6 pgs.

"International Application Serial No. PCT/US2020/017006, Written Opinion dated Jul. 30, 2020", 12 pgs.

Fieraru, Mihai, "Learning to Refine Human Pose Estimation", IEEE/CVF Conference on Computer Vision and Pattern Recognition Workshops (CVPRW), (2018), 318-327.

Lipeng, KE, "Multi-Scale Structure-Aware Network for Human Pose Estimation", Springer Nature Switzerland AG, ECCV 2018, LNCS 11206, (2018), 731-746.

Mehta, Dushyant, "VNect: Real-time 3D Human Pose Estimation with a Single RGB CdITISPd", arXiv:1705.01583v1 [cs.CV], (May 3, 2017), 13 pgs.

Giaccone, P. R, et al., "Foreground-background segmentation by cellular neural networks", IEEE 15th International Conference on Pattern Recognition (ICPR-2000), vol. 2 (2000), 438-441.

Kawai, Norhiko, et al., "Diminished Reality Based on Image Inpainting Considering Background Geometry", IEEE transactions on visualization and computer graphics, 22(3), (Mar. 1, 2016), 1236-1247.

Leyden, John, "This SMS will self-destruct in 40 seconds", [Online] Retrieved from the Internet: <URL:http://www.theregister.co.uk/2005/12/12/stealthtext/>, (Dec. 12, 2005), 1 pg.

Marto, Anabela G R, et al., "DinofelisAR Demo: Augmented Reality Based on Natural Features", 12th Iberian Conference on Information Systems and Technologies (CISTI), Lisbon, Portugal, (Jun. 2017), 6 pgs.

Nakajima, Yoshikatsu, et al., "Semantic Object Selection and Detection for Diminished Reality Based on SLAM with Viewpoint

(56) References Cited

OTHER PUBLICATIONS

Class", IEEE International Symposium on Mixed and Augmented Reality Adjunct Proceedings, (2017), 338-343.

Park, Jong-Seung, et al., "Virtual Object Placement in Video for Augmented Reality", Advances in Multimedia Information Processing-PCM 2005: 6th Pacific Rim Conference on Multimedia, Jeju Island, KR, Proceedings (vol. 3767), Springer, Berlin, DE, (2005), 13-24.

Robinson, Ian, "Add 3D text to video footage". Adobe.com/Youtube video. [Online]Retrieved from the Internet: <URL: https://helpx.adobe.com/after-effects/how-to/add-3d-text-video-footage.html>, (Mar. 10, 2017), 360 pgs.; 15:22 min.

Salas-Morena, Renato F, et al., "Dense Planar SLAM", IEEE Intl. Symposium on Mixed and Augmented Reality (ISMAR), Munich, Germany, [Online], Retrieved from the Internet: <URL: http://www.doc.ic.ac.uk/~bglocker/pdfs/salas-moreno2014ismar.pdf>, (Sep. 2014), 8 pgs.

Schettini, R, et al., "A segmentation algorithm for color images", Pattern Recognition Letters, Elsevier, Amsterdam, NL, vol. 14, No. 6 (Jun. 1, 1993), 499-506.

Shohei, Mori, et al., "A survey of diminished reality: Techniques for visually concealing, eliminating, and seeing through real objects", IPSJ Transactions on Computer Vision and Applications, vol. 9, No. 1, (Jun. 28, 2017), 14 pgs.

\* cited by examiner

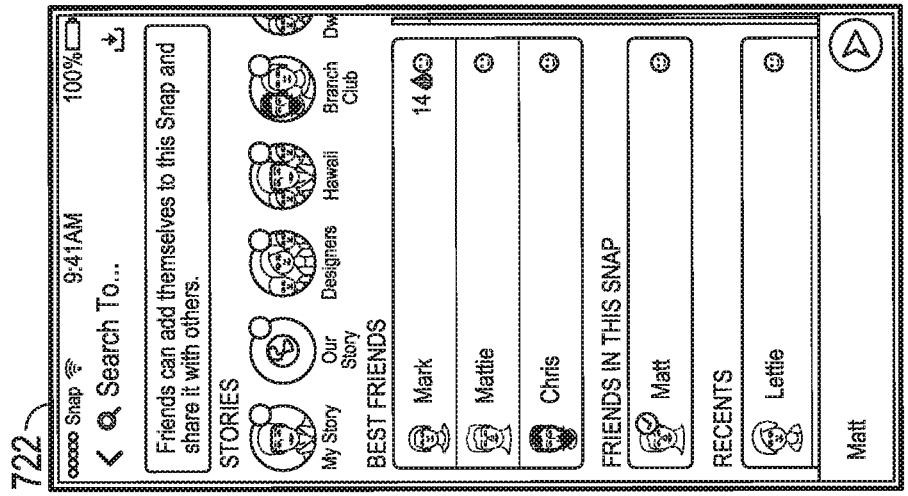
FIG. 7B
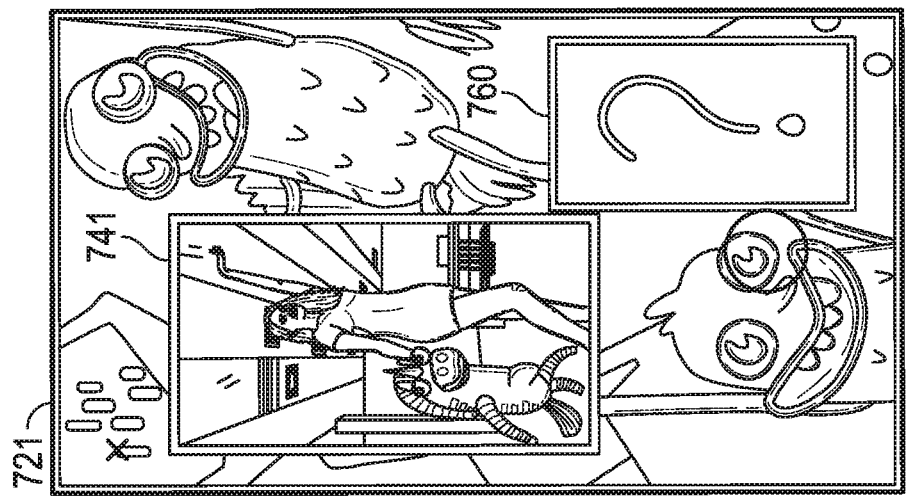

BODY POSE ESTIMATION

TECHNICAL FIELD

The present disclosure relates generally to generating virtual objects based on an image depicting a user.

BACKGROUND

Virtual rendering systems can be used to create engaging and entertaining augmented reality experiences, in which virtual object graphics, such as avatars, appear to be present in the real world. Such systems can be subject to presentation problems due to environmental conditions, user actions, unanticipated visual interruption between a camera and the object being rendered, and the like. This can cause a virtual object to disappear or otherwise behave erratically, which breaks the illusion of the virtual objects being present in the real world.

BRIEF DESCRIPTION OF THE DRAWINGS

In the drawings, which are not necessarily drawn to scale, like numerals may describe similar components in different views. To easily identify the discussion of any particular element or act, the most significant digit or digits in a reference number refer to the figure number in which that element is first introduced. Some embodiments are illustrated by way of example, and not limitation, in the figures of the accompanying drawings in which.

DETAILED DESCRIPTION

Figure 1:
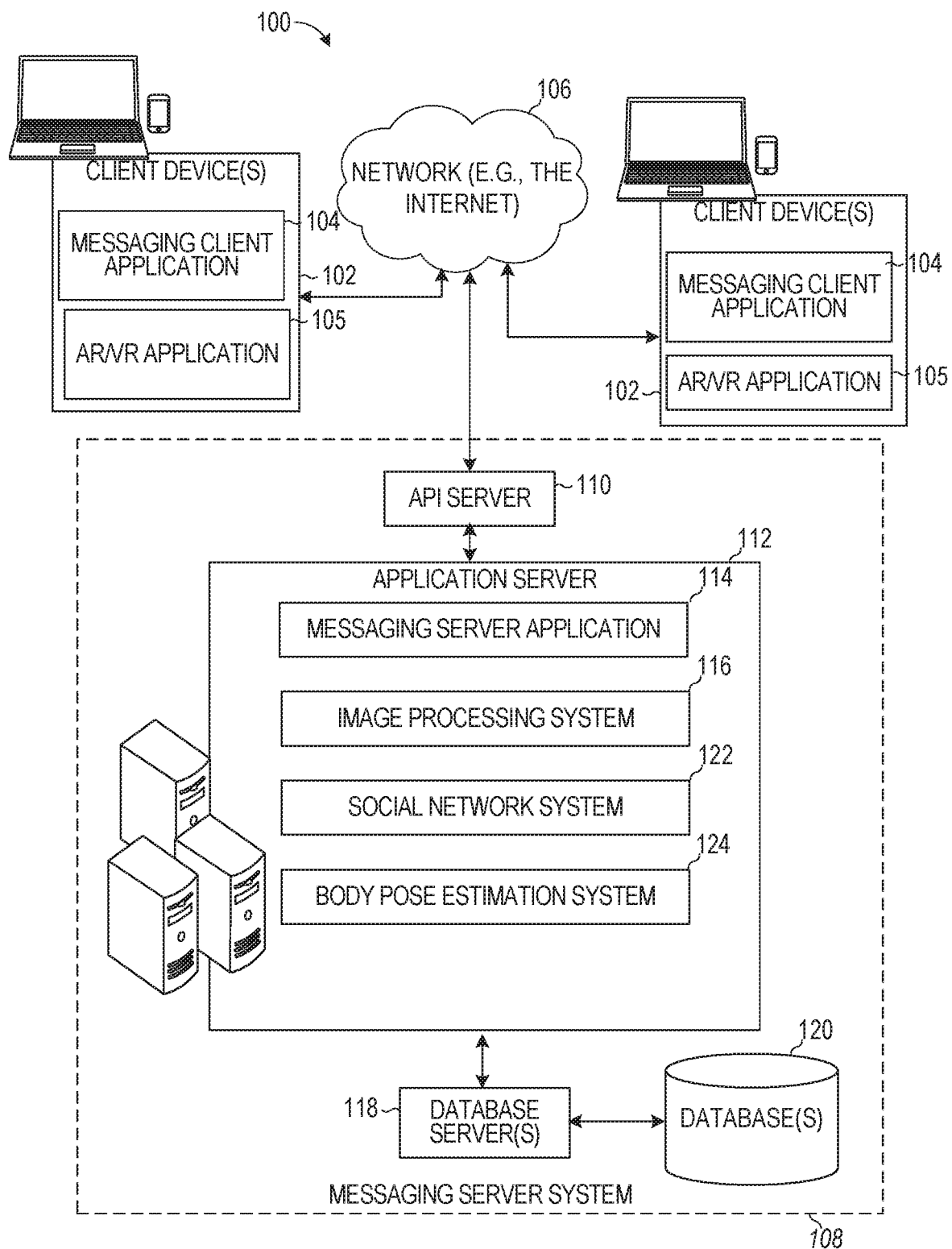
FIG. 1 is a block diagram showing an example messaging system for exchanging data (e.g., messages and associated content) over a network, according to example embodiments.

The description that follows includes systems, methods, techniques, instruction sequences, and computing machine program products that embody illustrative embodiments of the disclosure. In the following description, for the purposes of explanation, numerous specific details are set forth in order to provide an understanding of various embodiments. It will be evident, however, to those skilled in the art, that embodiments may be practiced without these specific details. In general, well-known instruction instances, protocols, structures, and techniques are not necessarily shown in detail.

Typically, virtual reality (VR) and augmented reality (AR) systems display avatars representing a given user by capturing an image of the user and, in addition, obtaining a depth map using a depth sensor of the real-world human body depicted in the image. By processing the depth map and the image together, the VR and AR systems can mimic actions performed by the user. While such systems work well for presenting avatars of a user, the need for a depth sensor limits the scope of their applications. This is because adding depth sensors to user devices for the purpose of displaying avatars increases the overall cost and complexity of the devices, making them less attractive.

The disclosed embodiments improve the efficiency of using the electronic device by applying machine learning techniques to generate one or more virtual objects for presentation in a VR or AR application from a single image of a user's body. The virtual object (e.g., a three-dimensional object, such as a 3D caption, emoji, character, avatar, animation, looping animation of a personalized avatar or character, looping or non-looping animated graphic such as a dancing hot dog, a stylized word with animation, and so forth) is generated directly from a single red, green, and blue (RGB) image (e.g., a monocular RGB image) or a video of RGB images depicting the real-world user's body. The disclosed embodiments generate the virtual object without also obtaining a depth map of the real-world user's body. This enables a user device with a simple RGB camera (without a depth sensor) to accurately and quickly render an animated virtual object based on the real-world user's body pose within the VR or AR application, allowing the user to interact with the VR or AR content in a more realistic environment.

In some embodiments, one such virtual object is selected by a user and added to the RGB image, and a pose of the virtual object is modified to match the pose of the user's body to provide the illusion that the selected virtual object is part of the real-world scene and is mimicking the user. Specifically, the disclosed embodiments process the image depicting the user's body, using machine learning techniques, to identify skeletal joints. A pose represented by the identified skeletal joints is determined. Once the pose represented by the skeletal joints is determined, corresponding skeletal joints of an avatar rig are adjusted to change a pose of the avatar to match the pose represented by the identified skeletal joints of the body of the user. The avatar with the modified pose that matches the pose represented by the identified skeletal joints of the body of the user is generated for display to the user.

In some embodiments, the avatar is a first avatar that is generated for display simultaneously with a first user in an image or video. An image of the first avatar mimicking a pose of the first user can be captured and sent to a second user. The second user may also capture an image in which a second avatar mimics a pose of the second user. The captured image depicting the second user and the second avatar is sent to the first user. Both the captured images of the first user with the first avatar and the second user with the second avatar may be simultaneously displayed and shared with other users.

In some embodiments, a position of the avatar relative to a position of the user in a given image or video is adjusted based on the user's position and/or pose within the image or video. For example, the avatar position changes to follow the user around the image or video from one place to another. In another implementation, based on the user's pose and joint positions, movements of the avatar can be adjusted to have the avatar interact with other virtual objects in the image. For example, an arm of the user can be raised to cause the corresponding arm of the avatar to be raised to reach for a virtual object (e.g., an apple on a tree) that is presented in the image or video.

FIG. 1 is a block diagram showing an example messaging system 100 for exchanging data (e.g., messages and associated content) over a network 106. The messaging system 100 includes multiple client devices 102, each of which hosts a number of applications, including a messaging client application 104 and a AR/VR application 105. Each messaging client application 104 is communicatively coupled to other instances of the messaging client application 104, the AR/VR application 105, and a messaging server system 108 via a network 106 (e.g., the Internet).

Accordingly, each messaging client application 104 and AR/VR application 105 is able to communicate and exchange data with another messaging client application 104 and AR/VR application 105 and with the messaging server system 108 via the network 106. The data exchanged between messaging client applications 104. AR/VR applications 105, and between a messaging client application 104 and the messaging server system 108 includes functions (e.g., commands to invoke functions) as well as payload data (e.g., text, audio, video, or other multimedia data).

AR/VR application 105 is an application that includes a set of functions that allow the client device 102 to access body pose estimation system 124. In some implementations, the AR/VR application 105 is a component or a feature that is part of the messaging client application 104. AR/VR application 105 uses an RGB camera to capture a monocular image of a user's real-world body. The AR/VR application 105 applies various trained machine learning techniques on the captured image of the body to generate an avatar. For example, the avatar is generated to have a pose that is the same as a pose of the user's body depicted in the image. As another example, the avatar is generated for simultaneous display with the user, and a position of the avatar changes from one frame to another based on a relative position of the user in the image. For example, the avatar position changes to maintain a constant distance between the avatar and the user so it appears the avatar follows the user around. In some implementations, the AR/VR application 105 continuously captures images of the user's body in real time or periodically to continuously or periodically update the generated avatar. This allows the user to move around in the real world and see the avatar update in real time. The AR/VR application 105 presents various content (e.g., messages, games, advertisements, and so forth) and allows the user to modify a pose of the avatar in the AR/VR application 105 to interact with other virtual content (e.g., the avatar pose can be modified to pick a virtual apple off of a virtual tree). Once the avatar is generated, the user can perform an action or gesture to capture an image of the user and the avatar for transmission to another user.

In order for AR/VR application 105 to generate the avatar directly from a captured RGB image, the AR/VR application 105 obtains one or more trained machine learning techniques from the body pose estimation system 124 and/or messaging server system 108. The trained machine learning techniques process the captured RGB image to extract one or more features from the RGB image that correspond to the body depicted in the captured RGB image. The features are analyzed to identify one or more skeletal joints and their respective alignment relative to one another. Specifically, the features are analyzed to determine the joint positions of a specified set of skeletal joints. The joint positions are provided to a database with an offset to identify a pose that is within the offset of the determined joint positions. After the pose is identified, an avatar is retrieved and a skeletal rig of the avatar is adjusted to mimic or copy the identified pose. In some embodiments, the skeletal rig of the avatar is adjusted directly from the joint positions that are determined rather than from an identified pose. The avatar is then generated for display based on the adjusted skeletal rig to mimic the pose of the body depicted in the captured image.

In some embodiments, the RGB image is a first frame of a plurality of frames of a video. In such cases, after a user's body is detected in the first frame using a first machine learning technique, the body pose estimation system 124 estimates where the user's body will be and at what scale in a second frame of the plurality of frames. The second frame may be adjacent to the first frame. In some implementations, a second machine learning technique is applied to the first frame to predict or estimate the position and scale of the user's body in the second frame.

In training, the body pose estimation system 124 obtains a first plurality of input training images that include different real-world body poses. These training images also provide the ground truth information about the body pose depicted in each image. A machine learning technique (e.g., a neural network) is trained based on features of the plurality of training images. Specifically, the machine learning technique extracts one or more features from a given training image and estimates a body pose by analyzing joint positions of the body depicted in the given training image. The machine learning technique obtains the ground truth information corresponding to the training image and adjusts one or more coefficients to improve subsequent estimations of a body pose depicted in a subsequent image. In some implementations, another machine learning technique extracts one or more features from a given training image and estimates a body pose in a subsequent image that is adjacent to the given training image by analyzing joint positions of the body depicted in the given training image. The machine learning technique obtains the ground truth information corresponding to the training image that identifies the body pose in the subsequent image and adjusts one or more coefficients to improve subsequent estimations of a body pose depicted in a subsequent image and estimations of body pose and scale in subsequent images. In some implementations, during training, the machine learning technique obtains reference 3D depth maps for each training image and uses the reference 3D depth map to estimate the body pose.

The messaging server system 108 provides server-side functionality via the network 106 to a particular messaging client application 104. While certain functions of the messaging system 100 are described herein as being performed by either a messaging client application 104 or by the messaging server system 108, it will be appreciated that the location of certain functionality either within the messaging client application 104 or the messaging server system 108 is a design choice. For example, it may be technically preferable to initially deploy certain technology and functionality within the messaging server system 108, but to later migrate this technology and functionality to the messaging client application 104 where a client device 102 has a sufficient processing capacity.

The messaging server system 108 supports various services and operations that are provided to the messaging client application 104. Such operations include transmitting data to, receiving data from, and processing data generated by the messaging client application 104. This data may include message content, client device information, geolocation information, media annotation and overlays, virtual objects, message content persistence conditions, social network information, and live event information, as examples. Data exchanges within the messaging system 100 are invoked and controlled through functions available via user interfaces (UIs) of the messaging client application 104.

Turning now specifically to the messaging server system 108, an Application Program Interface (API) server 110 is coupled to, and provides a programmatic interface to, an application server 112. The application server 112 is communicatively coupled to a database server 118, which facilitates access to a database 120 in which is stored data associated with messages processed by the application server 112.

Dealing specifically with the API server 110, this server 110 receives and transmits message data (e.g., commands and message payloads) between the client device 102 and the application server 112. Specifically, the API server 110 provides a set of interfaces (e.g., routines and protocols) that can be called or queried by the messaging client application 104 in order to invoke functionality of the application server 112. The API server 110 exposes various functions supported by the application server 112, including account registration; login functionality; the sending of messages, via the application server 112, from a particular messaging client application 104 to another messaging client application 104; the sending of media files (e.g., images or video) from a messaging client application 104 to the messaging server application 114, and for possible access by another messaging client application 104; the setting of a collection of media data (e.g., story); the retrieval of such collections; the retrieval of a list of friends of a user of a client device 102; the retrieval of messages and content; the adding and deleting of friends to a social graph; the location of friends within a social graph; access to user conversation data; access to avatar information stored on messaging server system 108; and opening an application event (e.g., relating to the messaging client application 104).

The application server 112 hosts a number of applications and subsystems, including a messaging server application 114, an image processing system 116, a social network system 122, and the body pose estimation system 124. The messaging server application 114 implements a number of message processing technologies and functions, particularly related to the aggregation and other processing of content (e.g., textual and multimedia content) included in messages received from multiple instances of the messaging client application 104. As will be described in further detail, the text and media content from multiple sources may be aggregated into collections of content (e.g., called stories or galleries). These collections are then made available, by the messaging server application 114, to the messaging client application 104. Other processor- and memory-intensive processing of data may also be performed server-side by the messaging server application 114, in view of the hardware requirements for such processing.

The application server 112 also includes an image processing system 116 that is dedicated to performing various image processing operations, typically with respect to images or video received within the payload of a message at the messaging server application 114. A portion of the image processing system 116 may also be implemented by the body pose estimation system 124.

The social network system 122 supports various social networking functions and services and makes these functions and services available to the messaging server application 114. To this end, the social network system 122 maintains and accesses an entity graph within the database 120. Examples of functions and services supported by the social network system 122 include the identification of other users of the messaging system 100 with which a particular user has relationships or is "following" and also the identification of other entities and interests of a particular user. Such other users may be referred to as the user's friends.

The application server 112 is communicatively coupled to a database server 118, which facilitates access to a database 120 in which is stored data associated with messages processed by the messaging server application 114.

Figure 2:
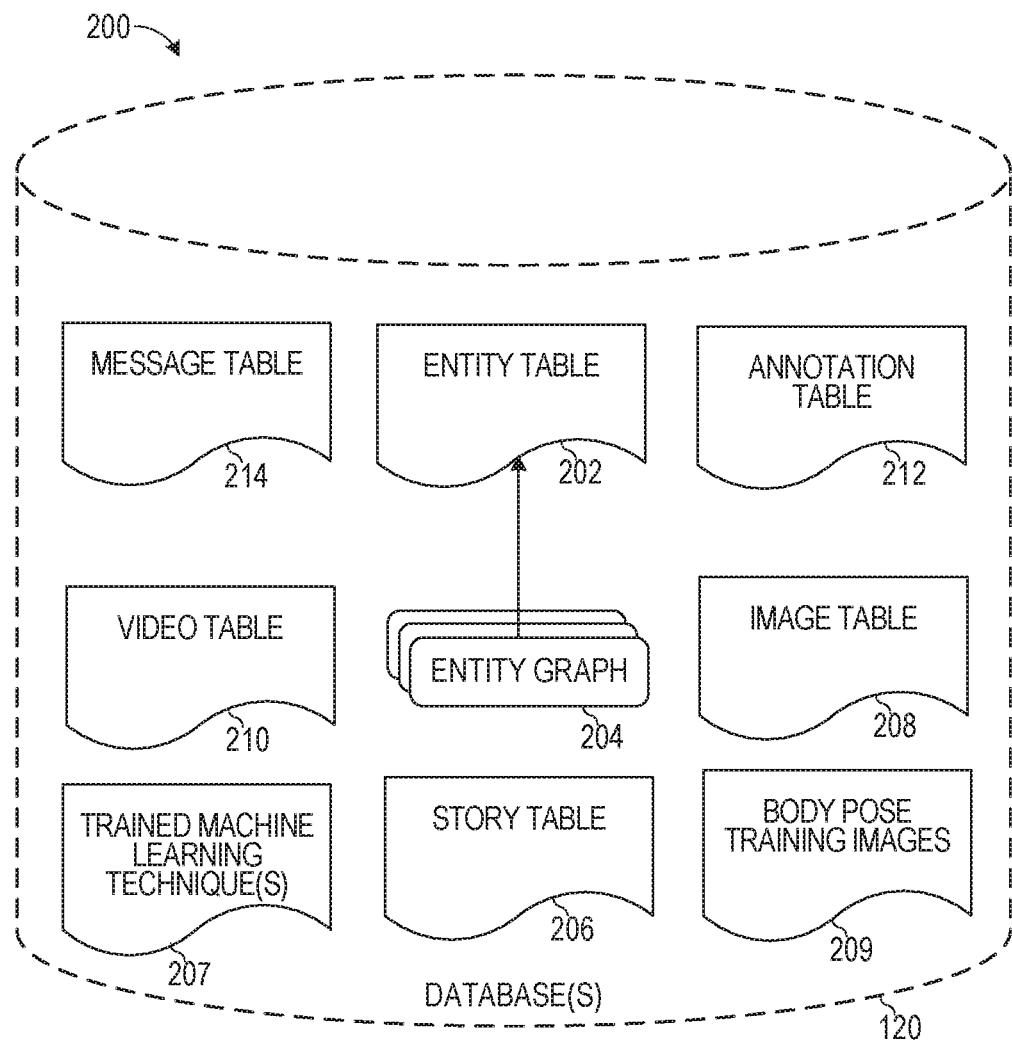
FIG. 2 is a schematic diagram illustrating data which may be stored in the database of a messaging server system, according to example embodiments.

FIG. 2 is a schematic diagram 200 illustrating data, which may be stored in the database 120 of the messaging server system 108, according to certain example embodiments. While the content of the database 120 is shown to comprise a number of tables, it will be appreciated that the data could be stored in other types of data structures (e.g., as an object-oriented database).

The database 120 includes message data stored within a message table 214. An entity table 202 stores entity data, including an entity graph 204. Entities for which records are maintained within the entity table 202 may include individuals, corporate entities, organizations, objects, places, events, and so forth. Regardless of type, any entity regarding which the messaging server system 108 stores data may be a recognized entity. Each entity is provided with a unique identifier, as well as an entity type identifier (not shown).

The entity graph 204 furthermore stores information regarding relationships and associations between entities. Such relationships may be social, professional (e.g., work at a common corporation or organization), interest-based, or activity-based, merely for example.

Message table 214 may store a collection of conversations between a user and one or more friends or entities. Message table 214 may include various attributes of each conversation, such as the list of participants, the size of the conversation (e.g., number of users and/or number of messages), the chat color of the conversation, a unique identifier for the conversation, and any other conversation related feature(s).

The database 120 also stores annotation data, in the example form of filters, in an annotation table 212. Database 120 also stores annotated content received in the annotation table 212. Filters for which data is stored within the annotation table 212 are associated with and applied to videos (for which data is stored in a video table 210) and/or images (for which data is stored in an image table 208). Filters, in one example, are overlays that are displayed as overlaid on an image or video during presentation to a recipient user. Filters may be of various types, including user-selected filters from a gallery of filters presented to a sending user by the messaging client application 104 when the sending user is composing a message. Other types of filters include geolocation filters (also known as geo-filters), which may be presented to a sending user based on geographic location. For example, geolocation filters specific to a neighborhood or special location may be presented within a UI by the messaging client application 104, based on geolocation information determined by a Global Positioning System (GPS) unit of the client device 102. Another type of filter is a data filter, which may be selectively presented to a sending user by the messaging client application 104, based on other inputs or information gathered by the client device 102 during the message creation process. Examples of data filters include current temperature at a specific location, a current speed at which a sending user is traveling, battery life for a client device 102, or the current time.

Other annotation data that may be stored within the image table 208 is so-called "lens" data. A "lens" may be a real-time special effect and sound that may be added to an image or a video.

As mentioned above, the video table 210 stores video data which, in one embodiment, is associated with messages for which records are maintained within the message table 214. Similarly, the image table 208 stores image data associated with messages for which message data is stored in the entity table 202. The entity table 202 may associate various annotations from the annotation table 212 with various images and videos stored in the image table 208 and the video table 210.

Trained machine learning technique(s) 207 stores parameters that have been trained during training of the body pose estimation system 124. For example, trained machine learning techniques 207 stores the trained parameters of a neural network machine learning technique.

Figure 5:
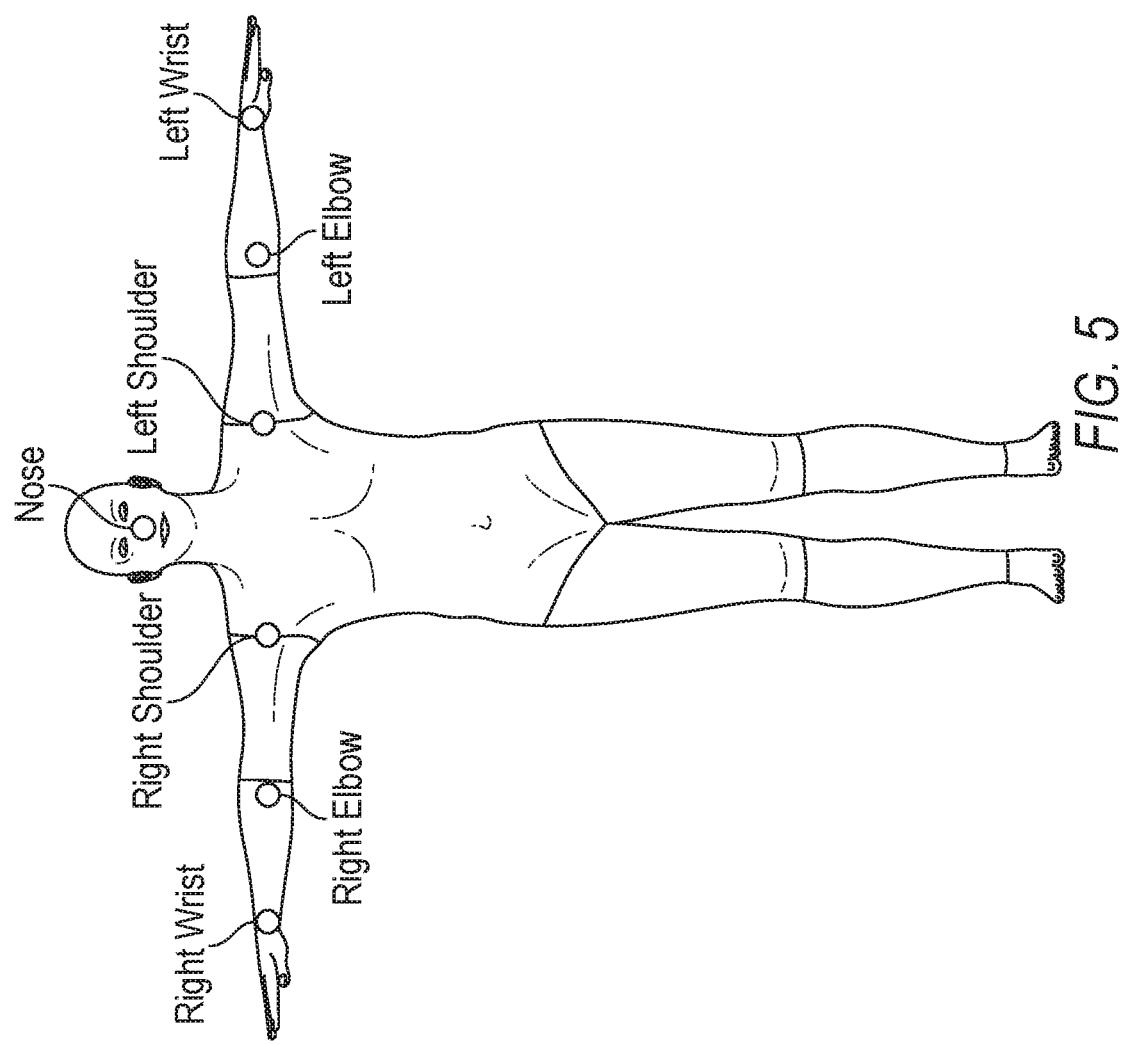
FIG. 5 is a diagram showing body joint positions used to determine a body pose, according to example embodiments.

Body pose training images 209 stores a plurality of images of depictions of real-world body poses. The plurality of images stored in the body pose training images 209 includes various depictions of a real-world body pose together with 3D depth information captured from a 3D depth sensor for each image. The plurality of images also include ground truth information identifying the body pose and the ground truth skeletal joint positions of one or more body skeletal joints. Examples of the skeletal joint positions that are identified for a given pose are shown in FIG. 5. These skeletal joint positions include a position of the right wrist, right elbow, right shoulder, a nose on a face, a left shoulder, a left elbow, and a left wrist. The skeletal joint positions can be determined relative to one another (e.g., how high one skeletal joint is relative to another or how high or low one skeletal joint is relative to the nose) to determine a given pose. These body pose training images 209 are used by the body pose estimation system 124 to train the machine learning techniques used to determine a body pose and skeletal joint positions from a received RGB monocular image of a user's body.

Returning to FIG. 2, a story table 206 stores data regarding collections of messages and associated image, video, or audio data, which are compiled into a collection (e.g., a story or a gallery). The creation of a particular collection may be initiated by a particular user (e.g., each user for which a record is maintained in the entity table 202). A user may create a "personal story" in the form of a collection of content that has been created and sent/broadcast by that user. To this end, the UI of the messaging client application 104 may include an icon that is user-selectable to enable a sending user to add specific content to his or her personal story.

A collection may also constitute a "live story," which is a collection of content from multiple users that is created manually, automatically, or using a combination of manual and automatic techniques. For example, a "live story" may constitute a curated stream of user-submitted content from various locations and events. Users whose client devices have location services enabled and are at a common location event at a particular time may, for example, be presented with an option, via a UI of the messaging client application 104, to contribute content to a particular live story. The live story may be identified to the user by the messaging client application 104 based on his or her location. The end result is a "live story" told from a community perspective.

A further type of content collection is known as a "location story," which enables a user whose client device 102 is located within a specific geographic location (e.g., on a college or university campus) to contribute to a particular collection. In some embodiments, a contribution to a location story may require a second degree of authentication to verify that the end user belongs to a specific organization or other entity (e.g., is a student on the university campus).

Figure 3:
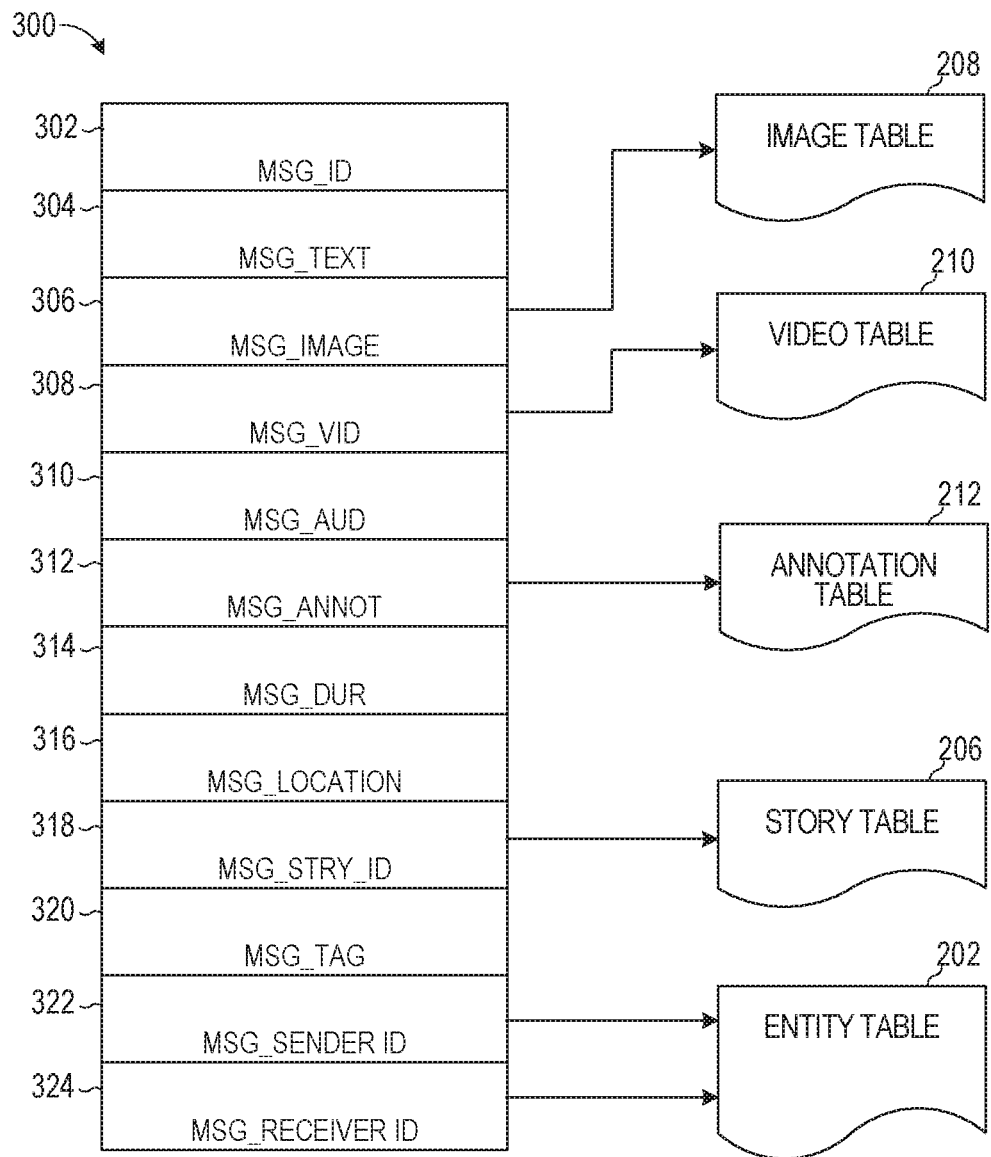
FIG. 3 is a schematic diagram illustrating a structure of a message generated by a messaging client application for communication, according to example embodiments.

FIG. 3 is a schematic diagram illustrating a structure of a message 300, according to some embodiments, generated by a messaging client application 104 for communication to a further messaging client application 104 or the messaging server application 114. The content of a particular message 300 is used to populate the message table 214 stored within the database 120, accessible by the messaging server application 114. Similarly, the content of a message 300 is stored in memory as "in-transit" or "in-flight" data of the client device 102 or the application server 112. The message 300 is shown to include the following components:

A message identifier 302: a unique identifier that identifies the message 300.

A message text payload 304: text, to be generated by a user via a UI of the client device 102 and that is included in the message 300.

A message image payload 306: image data, captured by a camera component of a client device 102 or retrieved from memory of a client device 102, and that is included in the message 300.

A message video payload 308: video data, captured by a camera component or retrieved from a memory component of the client device 102 and that is included in the message 300.

A message audio payload 310: audio data, captured by a microphone or retrieved from the memory component of the client device 102, and that is included in the message 300.

Message annotations 312: annotation data (e.g., filters, stickers, or other enhancements) that represents annotations to be applied to message image payload 306, message video payload 308, or message audio payload 310 of the message 300.

A message duration parameter 314: parameter value indicating, in seconds, the amount of time for which content of the message (e.g., the message image payload 306, message video payload 308, message audio payload 310) is to be presented or made accessible to a user via the messaging client application 104.

A message geolocation parameter 316: geolocation data (e.g., latitudinal and longitudinal coordinates) associated with the content payload of the message. Multiple message geolocation parameter 316 values may be included in the payload, with each of these parameter values being associated with respect to content items included in the content (e.g., a specific image within the message image payload 306, or a specific video in the message video payload 308).

A message story identifier 318: identifier value identifying one or more content collections (e.g., "stories") with which a particular content item in the message image payload 306 of the message 300 is associated. For example, multiple images within the message image payload 306 may each be associated with multiple content collections using identifier values.

A message tag 320: each message 300 may be tagged with multiple tags, each of which is indicative of the subject matter of content included in the message payload. For example, where a particular image included in the message image payload 306 depicts an animal (e.g., a lion), a tag value may be included within the message tag 320 that is indicative of the relevant animal. Tag values may be generated manually, based on user input, or may be automatically generated using, for example, image recognition.

A message sender identifier 322: an identifier (e.g., a messaging system identifier, email address, or device identifier) indicative of a user of the client device 102 on which the message 300 was generated and from which the message 300 was sent.

A message receiver identifier 324: an identifier (e.g., a messaging system identifier, email address, or device identifier) indicative of user(s) of the client device 102 to which the message 300 is addressed. In the case of a conversation between multiple users, the identifier may indicate each user involved in the conversation.

The contents (e.g., values) of the various components of message 300 may be pointers to locations in tables within which content data values are stored. For example, an image value in the message image payload 306 may be a pointer to (or address of) a location within an image table 208. Similarly, values within the message video payload 308 may point to data stored within a video table 210, values stored within the message annotations 312 may point to data stored in an annotation table 212, values stored within the message story identifier 318 may point to data stored in a story table 206, and values stored within the message sender identifier 322 and the message receiver identifier 324 may point to user records stored within an entity table 202.

Figure 4:
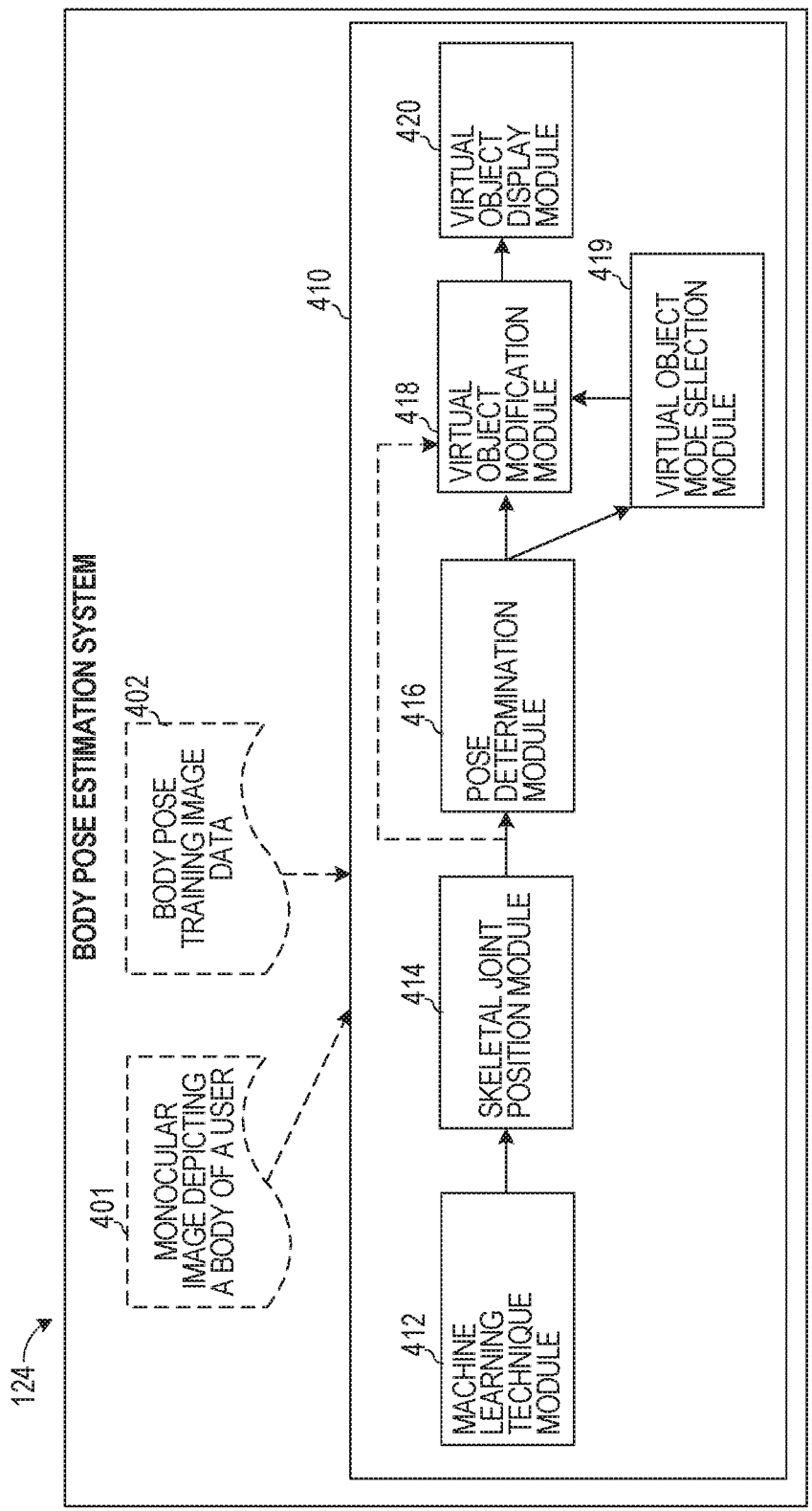
FIG. 4 is a block diagram showing an example body pose estimation system, according to example embodiments.

FIG. 4 is a block diagram showing an example body pose estimation system 124, according to example embodiments. Body pose estimation system 124 operates on a set of input data (e.g., a monocular image 401 depicting a real body of a user and body pose training image data 402). The set of input data is obtained from body pose training images 209 stored in database(s) 200 during the training phases and is obtained from an RGB camera of a client device 102 when a AR/VR application 105 is being used. Body pose estimation system 124 includes a machine learning technique module 412, a skeletal joint position module 414, a pose determination module 416, a virtual object modification module 418, a virtual object mode selection module 419 and a virtual object display module 420.

During training, according to the disclosed embodiments, body pose estimation system 124 receives a given training image (e.g., monocular image 401 depicting a real-world body, such as an image of a user's face, arms, torso, hips and legs) from body pose training image data 402. The body pose estimation system 124 applies one or more machine learning techniques using machine learning technique module 412 on the given training image. The machine learning technique module 412 extracts one or more features from the given training image to estimate skeletal joint positions of the skeletal joints depicted in the image. For example, the machine learning technique module 412 obtains the given training image depicting a user's face, arms, torso, hips and legs. The machine learning technique module 412 extracts features from the image that correspond to the user's face and arms to identify one or more skeletal joints (e.g., the joints shown in FIG. 5 including the left/right wrist joints, left/right elbow joints, left/right shoulder joints, and a nose position).

The machine learning technique module 412 determines the relative positions of the identified skeletal joints to determine a pose that corresponds to the skeletal joint positions. In an embodiment, the machine learning technique module 412 uses depth information associated with the given training image to assist in the determination of the skeletal joint positions and pose of the body. The machine learning technique module 412 compares the determined skeletal joint positions and the determined pose with the ground truth skeletal joint positions and pose provided as part of the body pose training image data 402. Based on a difference threshold of the comparison, the machine learning technique module 412 updates one or more coefficients and obtains one or more additional body pose training images. After a specified number of epochs or training images have been processed and/or when the difference threshold reaches a specified value, the machine learning technique module 412 completes training and the parameters and coefficients of the machine learning technique module 412 are stored in trained machine learning technique(s) 207. In some embodiments, portions of the machine learning technique module 412 are implemented by skeletal joint position module 414 and pose determination module 416.

After training, according to the disclosed embodiments, body pose estimation system 124 receives an input image 401 (e.g., monocular image depicting a real-world body, such as an image of a user's face, arms, torso, hips and legs) as a single RGB image from a client device 102. The body pose estimation system 124 applies the trained machine learning technique module 412 to the received input image 401 to extract one or more features representing the skeletal joints of the body depicted in the image 401.

In some embodiments, the rate at which the features are extracted from a video stream depicting the user's body is based on how close or far the user is positioned relative to the image capture device. For example, if the user is positioned far from the image capture device and appears really small in the images of the video, the features and as a result a pose of the user's body are analyzed less frequently (e.g., every 5 frames). If the user is positioned close to the image capture device and appears large in the images of the video, the features and as a result a pose of the user's body are analyzed more frequently (e.g., every 2 frames). The extracted features are provided to the skeletal joint position module 414. The skeletal joint position module 414 analyzes the skeletal joint features to determine coordinates of specific skeletal joints. For example, the skeletal joint position module 414 determines the x,y coordinates of a particular point of each skeletal joint, such as the x,y coordinates of the left wrist, the x,y coordinates of the left elbow, the x,y coordinates of the left shoulder, the x,y coordinates of the nose (or other facial feature such as mouth, ears or eyes), the x,y coordinates of the right wrist, the x,y coordinates of the right elbow, and the x,y coordinates of the right shoulder. The skeletal joint position module 414 provides the x,y coordinates of the specified skeletal joints to the pose determination module 416. In some embodiments, the skeletal joint position module 414 provides the x,y coordinates of the specified skeletal joints to the virtual object modification module 418. In an embodiment, the x,y coordinates represent x,y offsets of each skeletal joint relative to a neutral pose of the body.

Pose determination module 416 determines the relative positions of each of the skeletal joints received from the skeletal joint position module 414. For example, the pose determination module 416 determines that the left wrist is lower in the y direction than the right wrist by more than a first specified amount but less than second specified amount. Based on this determination, the pose determination module 416 estimates that the pose depicted in the image corresponds to a first pose. As another example, the pose determination module 416 determines that the left wrist is lower in the y direction than the right wrist by more than the first specified amount and the second specified amount. Based on this determination, the pose determination module 416 estimates that the pose depicted in the image corresponds to a second pose. In some embodiments, the pose determination module 416 searches a database based on the x,y coordinates received from the skeletal joint position module 414 to identify a pose that is within a predetermined threshold of the x,y coordinates.

Virtual object mode selection module 419 receives from a client device 102 a selection of a virtualization mode. For example, a user of the AR/VR application 105 may be presented with a list of mode options. In response to receiving a user selection of a given mode option from the list, the given mode is provided to the virtual object mode selection module 419 as the selection of the virtualization mode. The mode options may include a single avatar mimic option, a multiple avatar mimic option, an avatar visualization control option, an avatar follow option, and an avatar virtual world interaction option. The virtualization mode selection controls the way in which the skeletal joint positions of the user's body affect the skeletal rig of the avatar or the position of the avatar in the display relative to the user. The mode options may include a list of avatars of different forms and types for a user to select. The selected avatar is then used to retrieve the corresponding rig to adjust the skeletal rig according to the user's pose.

The virtual object modification module 418 can adjust the skeletal rig of a given avatar based on the mode selected by the virtual object mode selection module 419 and the pose or skeletal joint positions received from the skeletal joint position module 414 and/or pose determination module 416. The virtual object modification module 418 adjusts the way in which the avatar is presented in an image, such as by changing the pose, a visual attribute and/or a position of the avatar in the image. The adjusted avatar is provided by the virtual object modification module 418 to the virtual object display module 420. Virtual object display module 420 combines the adjusted avatar into the received monocular image depicting the user's body so that both the adjusted avatar and the user are simultaneously presented in an image. The image is provided by the virtual object display module 420 to the client device 102 and can then be sent to another user or stored for later access and display.

Figure 7A:
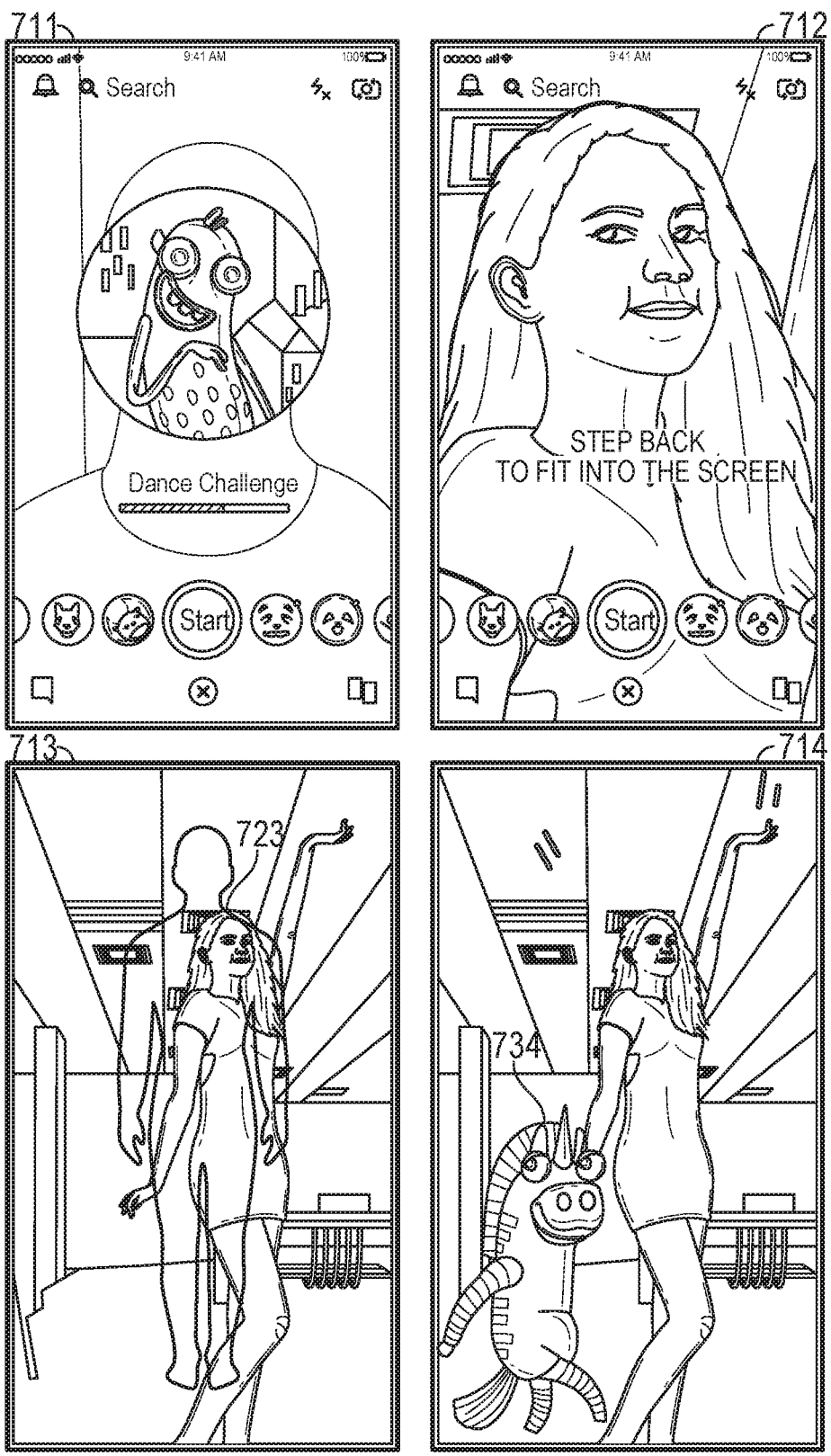
FIGS. 7A-8C are illustrative inputs and outputs of the body pose estimation system, according to example embodiments.

For example, selection of the single avatar mimic option instructs the virtual object modification module 418 to modify the skeletal rig of the avatar based on the relative distances between the skeletal joints of the user's body. In this way, the skeletal rig is modified to copy or mimic the pose represented by the user's body. Specifically, if the left wrist is determined to be offset higher from a neutral position of the left wrist by a certain ratio or percentage in the captured RGB image, the corresponding left wrist of the avatar skeletal rig is raised to a position that is also higher from a neutral position of the left wrist of the avatar by the same ratio or percentage. Each skeletal rig joint is similarly adjusted to copy the relative position of the skeletal joint positions of the body depicted in the image. For example, as shown in FIG. 7A, a user's body 723 is identified and the left wrist joint position of the user's body 723 is determined to be offset lower than a neutral left wrist joint position by a first amount, the right wrist joint position of the user's body 723 is determined to be offset higher than the neutral right wrist joint position by a second amount. In an embodiment, FIG. 5 represents the neutral skeletal joint positions of a user's body. The skeletal joint positions of a rig of the avatar 734 are similarly adjusted relative to their corresponding neutral positions to be offset by similar first and second amounts. As a result, the avatar 734 appears to mimic or copy the pose represented by the user's body 723.

Figure 8A:

As another example, selection of the multiple avatar mimic option instructs the virtual object modification module 418 to modify the skeletal rigs of multiple copies of the avatar based on the relative distances between the skeletal joints of the user's body. The multiple avatar mimic option causes avatars that are depicted in a first neutral position 1020 as shown in image 1011 of FIG. 8A to animate to a pose corresponding to a user's body as shown in image 1012. Specifically, multiple avatars shown in image 1011 may appear in different neutral poses (e.g., crawling on the floor on all four legs). In response to selection of the multiple avatar mimic option, the pose estimation system 124 analyzes a sequence of received monocular RGB images to determine when a pose of the user matches a specified pose. In response to determining that the pose of the user matches the specified pose, the pose estimation system 124 causes all of the avatars to copy the pose of the user (e.g., standing on two legs and positioning left and right arms in a similar pose as a user). The skeletal rigs of the avatars are adjusted in a similar manner as done for single avatar when the single avatar mimic option was selected. Another example is shown in images 1013 and 1014. In image 1013, avatars 1030 transition from a neutral position (laying flat on the floor) to a pose position 1032 that mimics the pose of the user (e.g., standing on two legs and positioning left and right arms in a similar pose as a user). When the avatar is a collection of papers, the papers are animated as flying around until the papers are arranged in a certain order in front of or behind the user and in the pose that matches the user's body pose.

Figure 8B:
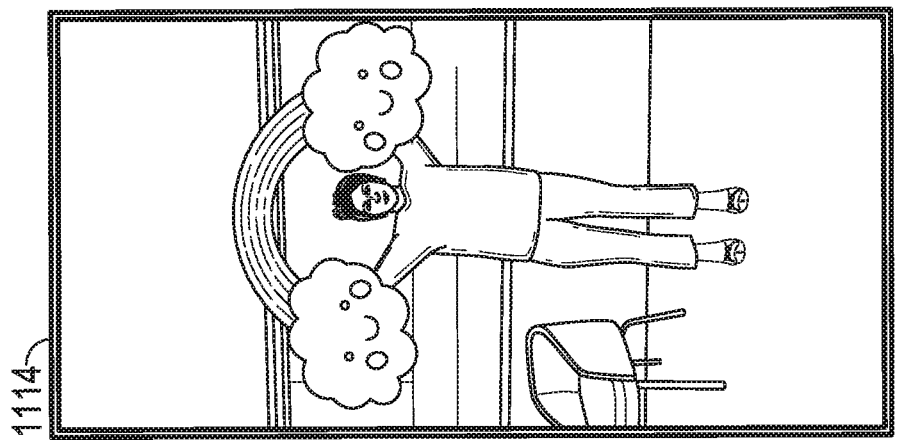
Figure 8B:
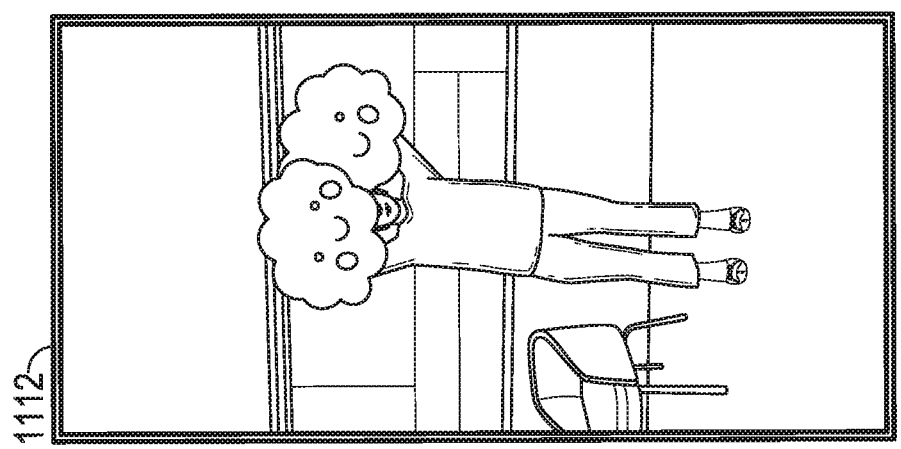
Figure 8B:
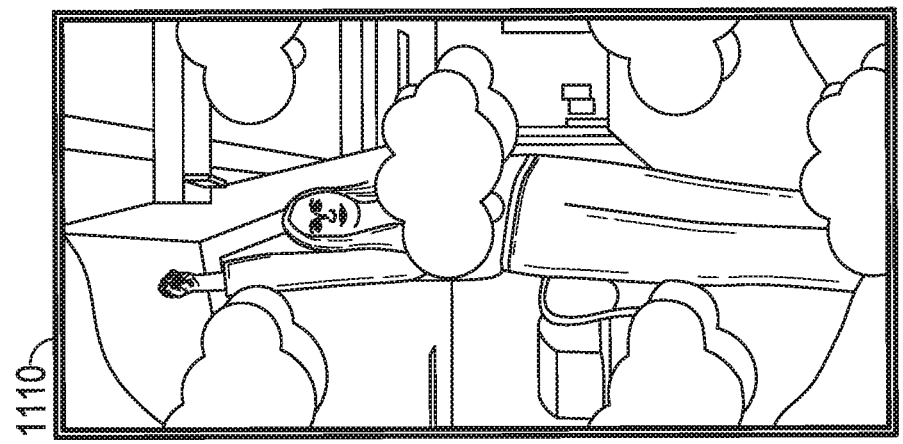

As another example, selection of the avatar visualization control option instructs the virtual object modification module 418 to modify a visual attribute of the avatar based on a pose of the user. For example, an avatar is presented on a screen as moving at a given rate from top to bottom or from left to right. Specifically, clouds shown in image 1110 of FIG. 8B can be animated moving down across the screen in front of the user. Based on a pose of the user or based on how slowly or quickly a user transitions from one pose to another, the rate at which the clouds move across the screen can be increased or decreased. As another example, an avatar (e.g., clouds) can be positioned over the user's hands as shown in image 1112. When the user changes pose from hands being vertical and straight up in the air to having the hands extending horizontally, the avatar continues to follow the user's hands and be positioned over the user's hands but a visual attribute of the avatar changes (e.g., the clouds now present a rainbow above the user from a first cloud positioned over one hand to a second cloud positioned over a second hand) as shown in image 1114. The change in the visual attribute may also include changing a face depicted on the avatar from smiling to frowning or a color of the avatar can be changed based on the change to the user's skeletal joint positions.

Figure 8C:
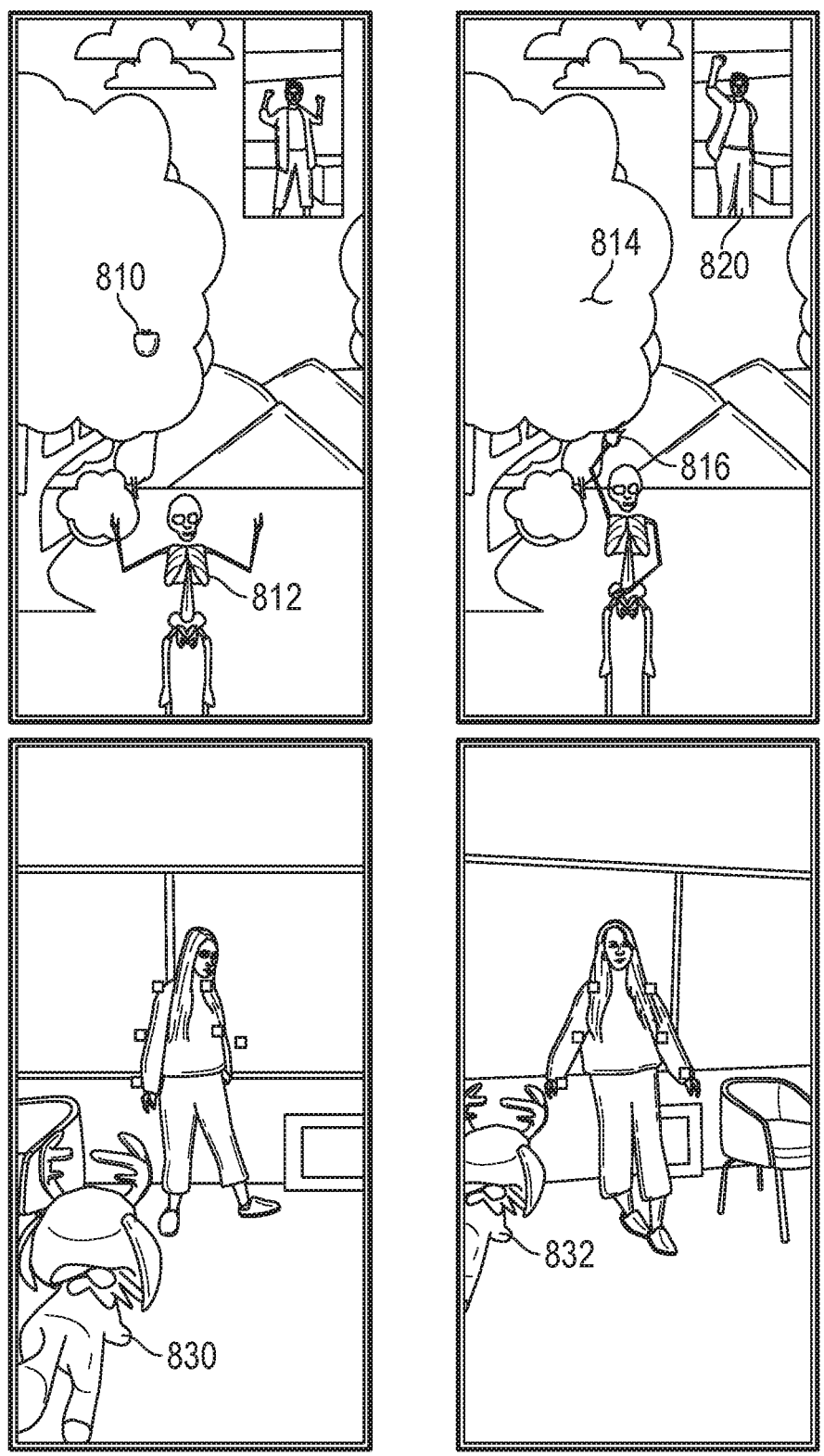

As another example, selection of the avatar virtual world interaction instructs the virtual object modification module 418 to cause the avatar to interact with another virtual object that is in the image. For example, the avatar is displayed in an image that includes virtual objects (e.g., a virtual tree and a virtual apple on the tree). The avatar pose and movement track and mimic skeletal joint positions of the user in way that allows the avatar to interact with the virtual objects. Specifically. FIG. 8C shows a virtual apple 810 and an avatar 812 with arms that have the right and left wrists at a particular position level to each other in the vertical direction. The right hand of the avatar 812 in this position is at a first distance away from the virtual apple 810. When the user's body 820 depicted in the image raises the right arm, the avatar's 812 right arm 816 is also raised relative to the left arm, which also raises the right wrist of the avatar 812. In this position, the right wrist and elbow of the avatar 812 is higher than the left wrist and elbow, and the right hand of the avatar 812 is at a second distance away from the virtual apple 810. The distance between the right hand of the avatar 812 and the position of the virtual apple 810 is determined to be less than a threshold, and as a result, the virtual apple 810 becomes detached from the virtual tree 814 and is pinned to the right hand of the avatar 812. As shown, the virtual apple 810 is no longer presented on the virtual tree 814, and when the user lowers their arms, the avatar's left and right arms are also lowered to reveal that the right hand is now holding the virtual apple 810. In this way, the user can cause the avatar 812 to mimic the user's pose to interact with one or more virtual objects in an image or video.

As another example, selection of the avatar follow option instructs the virtual object modification module 418 to maintain a given distance between the avatar and the user. Specifically, this option causes the avatar to follow the user through a sequence of images. For example, the position of the avatar in the image depicting the user's body is changed as the user's body position in the image changes. In particular, if the user moves to the right by a certain amount, the position of the displayed avatar also is moved to the right by the same certain amount. FIG. 8C shows an avatar in a first position 830 relative to the user depicted in the image and at a first distance between the avatar and the user in 2D or 3D space. As the user moves to a second position, the avatar is moved to a second position 832 to maintain the same distance from the user depicted in the image.

Figure 6:
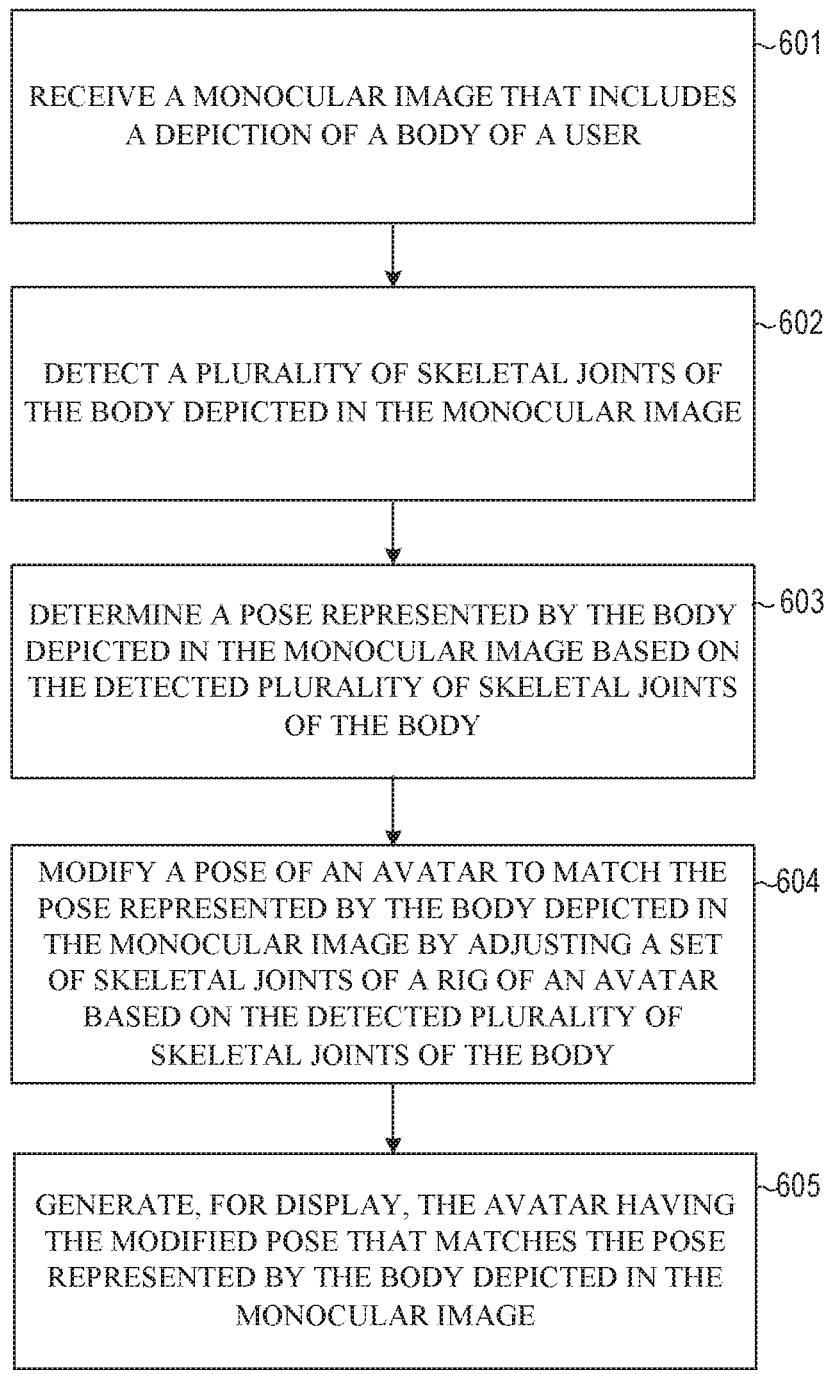
FIG. 6 is a flowchart illustrating example operations of the body pose estimation system, according to example embodiments.

FIG. 6 is a flowchart illustrating example operations of the body pose estimation system 124 in performing process 600, according to example embodiments. The process 600 may be embodied in computer-readable instructions for execution by one or more processors such that the operations of the process 600 may be performed in part or in whole by the functional components of the messaging server system 108 and/or AR/VR application 105; accordingly, the process 600 is described below by way of example with reference thereto. However, in other embodiments, at least some of the operations of the process 600 may be deployed on various other hardware configurations. The process 600 is therefore not intended to be limited to the messaging server system 108 and can be implemented in whole, or in part, by any other component. Some or all of the operations of process 600 can be in parallel, out of order, or entirely omitted.

At operation 601, the body pose estimation system 124 receives a monocular image that includes a depiction of a body of a user. For example, the machine learning technique module 412 receives the monocular image 401 depicting a body of a user. The machine learning technique module 412 extracts one or more features from the image indicating skeletal joints.

At operation 602, the body pose estimation system 124 detects a plurality of skeletal joints of the body depicted in the monocular image 401. For example, the skeletal joint position module 414 processes the features extracted by the machine learning technique module 412 to determine positions of a set of skeletal joints. The positions may be determined with respect to neutral positions of each skeletal joint.

At operation 603, the body pose estimation system 124 determines a pose represented by the body depicted in the monocular image 401 based on the detected plurality of skeletal joints of the body. For example, pose determination module 416 analyzes the relative positions of each of the skeletal joint positions to identify a pose corresponding to the skeletal joint positions.

At operation 604, the body pose estimation system 124 modifies a pose of an avatar to match the pose represented by the body depicted in the monocular image 401 by adjusting a set of skeletal joints of a rig of an avatar based on the detected plurality of skeletal joints of the body. For example, the virtual object modification module 418, based on a virtual object mode provided by the virtual object mode selection module 419, adjusts skeletal joints of a rig of the avatar so that each skeletal joint is offset relative to a neutral position of the joint by an amount corresponding to the amount the corresponding skeletal joint of the body in the image 401 is offset from the neutral position.

At operation 605, the body pose estimation system 124 generates, for display, the avatar having the modified pose that matches the pose represented by the body depicted in the monocular image 401. For example, virtual object display module 420 receives the adjusted avatar and combines the avatar in the image 401 that depicts the user's body for transmission to the client device 102.

Figure 7C:
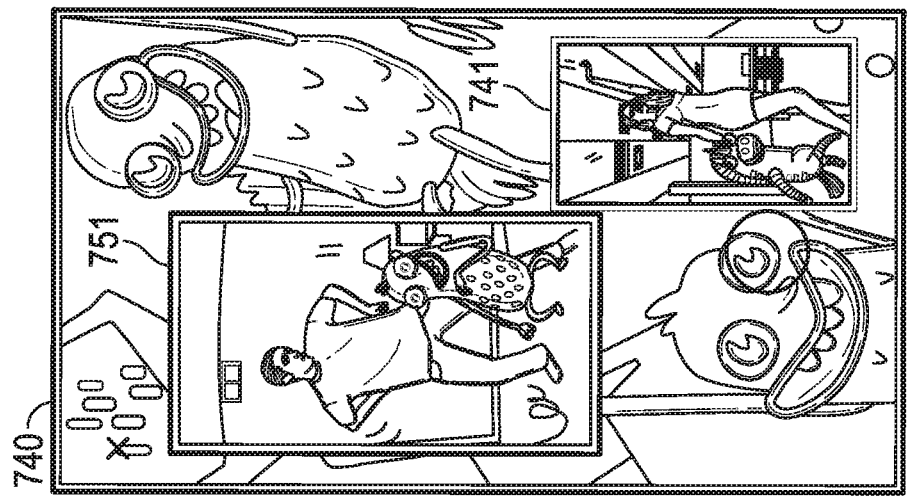
Figure 7C:
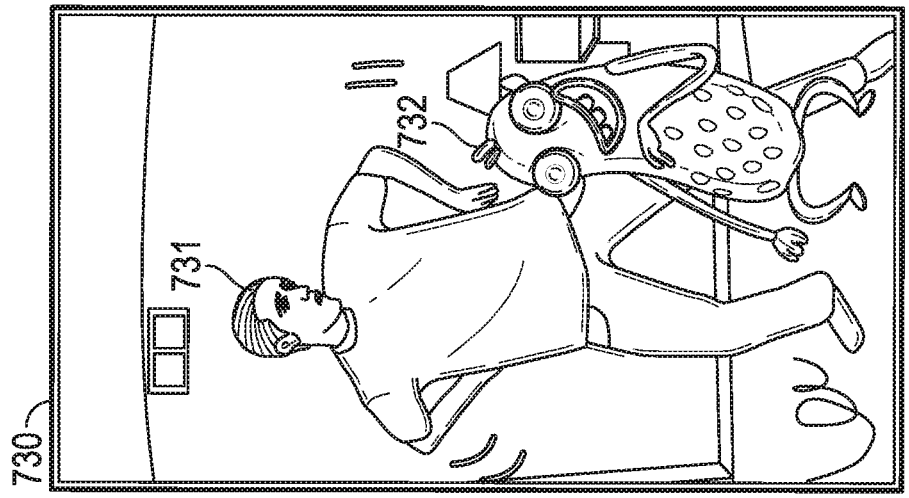

FIGS. 7A-C show illustrative inputs and outputs of the body pose estimation system 124, according to example embodiments. The inputs and outputs shown in FIGS. 7A-C can be implemented by the AR/VR application 105. In some embodiments, a first user accesses the body pose estimation system 124 to exchange images depicting the user and a corresponding avatar to another user. The first user is presented with a screen 711 that includes an avatar selection region and an option to start exchanging images. After the first user selects the avatar and selects the start option, an instruction is presented to the first user in screen 712 to position the first user a specified distance from the image capture device. For example, the first user is instructed to step back so that the user's body fits within the image captured by the image capture device.

In an embodiment, the first user is instructed to step far enough away from the image capture device until a predetermined set of skeletal joints are visible but not all of the skeletal joints are visible. Specifically, the body pose estimation system 124 may only need the wrist positions, elbow positions, shoulder positions and nose position to be visible in an image, but not the leg positions. In some embodiments, the skeletal joints of the first user that are visible in the image cause the same corresponding skeletal joints of the avatar to be adjusted. For example, if only the first user's arms are visible in the image, then only the avatar's arms are adjusted to mimic the first user's arm position. If the user's entire body is visible including the user's legs, then the entire avatar rig is adjusted including the avatar legs to mimic the first user's body pose.

The user's body pose is obtained in screen 713 and the body pose estimation system 124 generates for display in screen 714 an avatar 734 with the same or similar pose as the first user. The first user can speak a predetermined word or, if the user maintains the same pose for a threshold period of time, a screenshot or image is captured that features the user in the pose and the avatar mimicking the user's pose.

As shown in FIG. 7B, a screenshot 741 is shown to the first user in screen 721. A blank space 760 may be included in screen 721 indicating that receipt of a corresponding screenshot from a second user is pending. The first user may select or press on the blank space 760 to cause a list of recipients to be presented in screen 722. Specifically, screen 722 presents a list of the first user's friends. The first user may select a given friend "Matt" and the body pose estimation system 124 transmits the screenshot 741 to the selected friend "Matt".

As shown in FIG. 7C, the second user 731 follows a similar sequence as the first user to cause a second avatar 732 to mimic a pose of the second user 731 as shown in screen 730. Particularly, screen 730 is provided on a different mobile device that is associated with the second user 731. The second user 731 selects the second avatar 732 and is instructed to step back so that the body pose estimation system 124 can estimate the body pose of the user 731 and adjust the selected second avatar 732 to mimic the second user's body pose. The body pose estimation system 124 captures an image 751 depicting the second user 731 and the second avatar 732 in the given pose and presents the captured image 751 in a screen 740. The captured image 751 is automatically sent to the first user. The captured image 751 depicting the second user 731 and the second avatar 732 in a given pose is presented together with the screenshot 741 depicting the first user and the first avatar in another pose.

Figure 9:
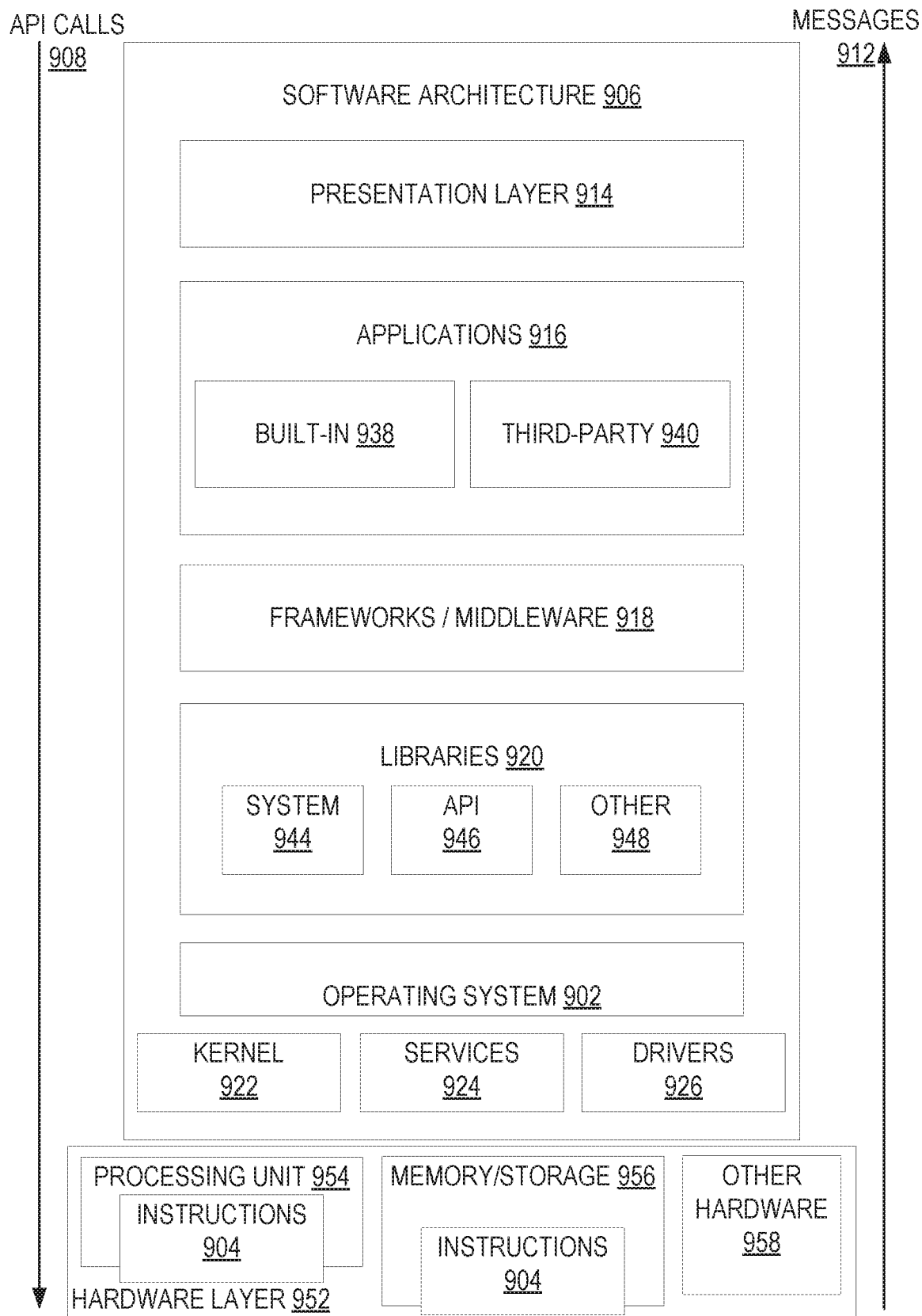
FIG. 9 is a block diagram illustrating a representative software architecture, which may be used in conjunction with various hardware architectures herein described, according to example embodiments.

FIG. 9 is a block diagram illustrating an example software architecture 906, which may be used in conjunction with various hardware architectures herein described. FIG. 9 is a non-limiting example of a software architecture and it will be appreciated that many other architectures may be implemented to facilitate the functionality described herein. The software architecture 906 may execute on hardware such as machine 1000 of FIG. 10 that includes, among other things, processors 1004, memory 1014, and input/output (I/O) components 1018. A representative hardware layer 952 is illustrated and can represent, for example, the machine 1000 of FIG. 10. The representative hardware layer 952 includes a processing unit 954 having associated executable instructions 904. Executable instructions 904 represent the executable instructions of the software architecture 906, including implementation of the methods, components, and so forth described herein. The hardware layer 952 also includes memory and/or storage modules memory/storage 956, which also have executable instructions 904. The hardware layer 952 may also comprise other hardware 958.

In the example architecture of FIG. 9, the software architecture 906 may be conceptualized as a stack of layers where each layer provides particular functionality. For example, the software architecture 906 may include layers such as an operating system 902, libraries 920, frameworks/middleware 918, applications 916, and a presentation layer 914. Operationally, the applications 916 and/or other components within the layers may invoke API calls 908 through the software stack and receive messages 912 in response to the API calls 908. The layers illustrated are representative in nature and not all software architectures have all layers. For example, some mobile or special purpose operating systems may not provide a frameworks/middleware 918, while others may provide such a layer. Other software architectures may include additional or different layers.

The operating system 902 may manage hardware resources and provide common services. The operating system 902 may include, for example, a kernel 922, services 924, and drivers 926. The kernel 922 may act as an abstraction layer between the hardware and the other software layers. For example, the kernel 922 may be responsible for memory management, processor management (e.g., scheduling), component management, networking, security settings, and so on. The services 924 may provide other common services for the other software layers. The drivers 926 are responsible for controlling or interfacing with the underlying hardware. For instance, the drivers 926 include display drivers, camera drivers, Bluetooth® drivers, flash memory drivers, serial communication drivers (e.g., Universal Serial Bus (USB) drivers). Wi-Fi® drivers, audio drivers, power management drivers, and so forth depending on the hardware configuration.

The libraries 920 provide a common infrastructure that is used by the applications 916 and/or other components and/or layers. The libraries 920 provide functionality that allows other software components to perform tasks in an easier fashion than to interface directly with the underlying operating system 902 functionality (e.g., kernel 922, services 924 and/or drivers 926). The libraries 920 may include system libraries 944 (e.g., C standard library) that may provide functions such as memory allocation functions, string manipulation functions, mathematical functions, and the like. In addition, the libraries 920 may include API libraries 946 such as media libraries (e.g., libraries to support presentation and manipulation of various media format such as MPREG4, H.264, MP3, AAC, AMR, JPG, PNG), graphics libraries (e.g., an OpenGL framework that may be used to render two-dimensional and three-dimensional in a graphic content on a display), database libraries (e.g., SQLite that may provide various relational database functions), web libraries (e.g., WebKit that may provide web browsing functionality), and the like. The libraries 920 may also include a wide variety of other libraries 948 to provide many other APIs to the applications 916 and other software components/modules.

The frameworks/middleware 918 (also sometimes referred to as middleware) provide a higher-level common infrastructure that may be used by the applications 916 and/or other software components/modules. For example, the frameworks/middleware 918 may provide various graphic UI (GUI) functions, high-level resource management, high-level location services, and so forth. The frameworks/middleware 918 may provide a broad spectrum of other APIs that may be utilized by the applications 916 and/or other software components/modules, some of which may be specific to a particular operating system 902 or platform.

The applications 916 include built-in applications 938 and/or third-party applications 940. Examples of representative built-in applications 938 may include, but are not limited to, a contacts application, a browser application, a book reader application, a location application, a media application, a messaging application, and/or a game application. Third-party applications 940 may include an application developed using the ANDROID™ or IOS™ software development kit (SDK) by an entity other than the vendor of the particular platform, and may be mobile software running on a mobile operating system such as IOS™, ANDROID™, WINDOWS® Phone, or other mobile operating systems. The third-party applications 940 may invoke the API calls 908 provided by the mobile operating system (such as operating system 902) to facilitate functionality described herein.

The applications 916 may use built-in operating system functions (e.g., kernel 922, services 924, and/or drivers 926), libraries 920, and frameworks/middleware 918 to create UIs to interact with users of the system. Alternatively, or additionally, in some systems, interactions with a user may occur through a presentation layer, such as presentation layer 914. In these systems, the application/component "logic" can be separated from the aspects of the application/component that interact with a user.

Figure 10:
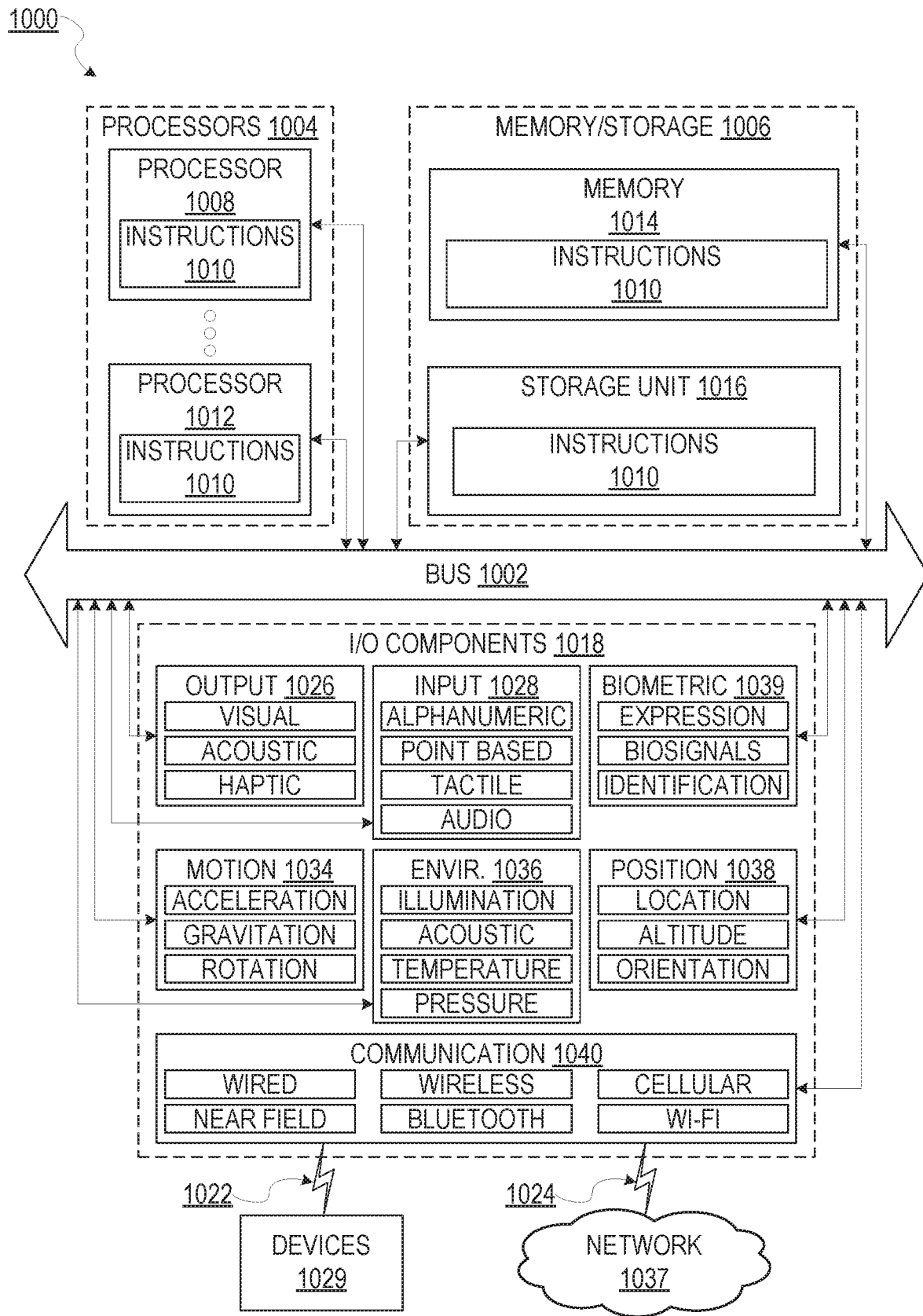
FIG. 10 is a block diagram illustrating components of a machine able to read instructions from a machine-readable medium (e.g., a machine-readable storage medium) and perform any one or more of the methodologies discussed herein, according to example embodiments.

FIG. 10 is a block diagram illustrating components of a machine 1000, according to some example embodiments, able to read instructions from a machine-readable medium (e.g., a machine-readable storage medium) and perform any one or more of the methodologies discussed herein. Specifically, FIG. 10 shows a diagrammatic representation of the machine 1000 in the example form of a computer system, within which instructions 1010 (e.g., software, a program, an application, an applet, an app, or other executable code) for causing the machine 1000 to perform any one or more of the methodologies discussed herein may be executed. As such, the instructions 1010 may be used to implement modules or components described herein. The instructions 1010 transform the general, non-programmed machine 1000 into a particular machine 1000 programmed to carry out the described and illustrated functions in the manner described. In alternative embodiments, the machine 1000 operates as a standalone device or may be coupled (e.g., networked) to other machines. In a networked deployment, the machine 1000 may operate in the capacity of a server machine or a client machine in a server-client network environment, or as a peer machine in a peer-to-peer (or distributed) network environment. The machine 1000 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 1010, sequentially or otherwise, that specify actions to be taken by machine 1000. Further, while only a single machine 1000 is illustrated, the term "machine" shall also be taken to include a collection of machines that individually or jointly execute the instructions 1010 to perform any one or more of the methodologies discussed herein.

The machine 1000 may include processors 1004, memory/storage 1006, and I/O components 1018, which may be configured to communicate with each other such as via a bus 1002. In an example embodiment, the processors 1004 (e.g., a central processing unit (CPU), a reduced instruction set computing (RISC) processor, a complex instruction set computing (CISC) processor, a graphics processing unit (GPU), a digital signal processor (DSP), an application-specific integrated circuit (ASIC), a radio-frequency integrated circuit (RFIC), another processor, or any suitable combination thereof) may include, for example, a processor 1008 and a processor 1012 that may execute the instructions 1010. The term "processor" is intended to include multi-core processors 1004 that may comprise two or more independent processors (sometimes referred to as "cores") that may execute instructions contemporaneously. Although FIG. 10 shows multiple processors 1004, the machine 1000 may include a single processor with a single core, a single processor with multiple cores (e.g., a multi-core processor), multiple processors with a single core, multiple processors with multiple cores, or any combination thereof.

The memory/storage 1006 may include a memory 1014, such as a main memory, or other memory storage, and a storage unit 1016, both accessible to the processors 1004 such as via the bus 1002. The storage unit 1016 and memory 1014 store the instructions 1010 embodying any one or more of the methodologies or functions described herein. The instructions 1010 may also reside, completely or partially, within the memory 1014, within the storage unit 1016, within at least one of the processors 1004 (e.g., within the processor's cache memory), or any suitable combination thereof, during execution thereof by the machine 1000. Accordingly, the memory 1014, the storage unit 1016, and the memory of processors 1004 are examples of machine-readable media.

The I/O components 1018 may include a wide variety of components to receive input, provide output, produce output, transmit information, exchange information, capture measurements, and so on. The specific I/O components 1018 that are included in a particular machine 1000 will depend on the type of machine. For example, portable machines such as mobile phones will likely include a touch input device or other such input mechanisms, while a headless server machine will likely not include such a touch input device. It will be appreciated that the I/O components 1018 may include many other components that are not shown in FIG. 10. The I/O components 1018 are grouped according to functionality merely for simplifying the following discussion and the grouping is in no way limiting. In various example embodiments, the I/O components 1018 may include output components 1026 and input components 1028. The output components 1026 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 1028 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or other pointing instrument), tactile input components (e.g., a physical button, a touch screen that provides location and/or force of touches or touch gestures, or other tactile input components), audio input components (e.g., a microphone), and the like.

In further example embodiments, the I/O components 1018 may include biometric components 1039, motion components 1034, environmental components 1036, or position components 1038 among a wide array of other components. For example, the biometric components 1039 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 1034 may include acceleration sensor components (e.g., accelerometer), gravitation sensor components, rotation sensor components (e.g., gyroscope), and so forth. The environmental components 1036 may include, for example, illumination sensor components (e.g., photometer), temperature sensor components (e.g., one or more thermometer that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 1038 may include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1018 may include communication components 1040 operable to couple the machine 1000 to a network 1037 or devices 1029 via coupling 1024 and coupling 1022, respectively. For example, the communication components 1040 may include a network interface component or other suitable device to interface with the network 1037. In further examples, communication components 1040 may include wired communication components, wireless communication components, cellular communication components. Near Field Communication (NFC) components. Bluetooth® components (e.g., Bluetooth® Low Energy), Wi-Fi® components, and other communication components to provide communication via other modalities. The devices 1029 may be another machine or any of a wide variety of peripheral devices (e.g., a peripheral device coupled via a USB).

Moreover, the communication components 1040 may detect identifiers or include components operable to detect identifiers. For example, the communication components 1040 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 1040, such as, location via Internet Protocol (IP) geo-location, location via Wi-Fi® signal triangulation, location via detecting a NFC beacon signal that may indicate a particular location, and so forth.

Glossary

"CARRIER SIGNAL" in this context refers to any intangible medium that is capable of storing, encoding, or carrying transitory or non-transitory instructions for execution by the machine, and includes digital or analog communications signals or other intangible medium to facilitate communication of such instructions. Instructions may be transmitted or received over the network using a transitory or non-transitory transmission medium via a network interface device and using any one of a number of well-known transfer protocols.

"CLIENT DEVICE" in this context refers to any machine that interfaces to a communications network to obtain resources from one or more server systems or other client devices. A client device may be, but is not limited to, a mobile phone, desktop computer, laptop, PDAs, smart phones, tablets, ultra books, netbooks, laptops, multi-processor systems, microprocessor-based or programmable consumer electronics, game consoles, set-top boxes, or any other communication device that a user may use to access a network.

"COMMUNICATIONS NETWORK" in this context refers to one or more portions of a network that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network may include a wireless or cellular network and the coupling may be a Code Division Multiple Access (CDMA) connection, a Global System for Mobile communications (GSM) connection, or other type of cellular or wireless coupling. In this example, the coupling may implement any of a variety of types of data transfer technology, such as Single Carrier Radio Transmission Technology (1xRTT). Evolution-Data Optimized (EVDO) technology, General Packet Radio Service (GPRS) technology. Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard setting organizations, other long range protocols, or other data transfer technology.

"EPHEMERAL MESSAGE" in this context refers to a message that is accessible for a time-limited duration. An ephemeral message may be a text, an image, a video, and the like. The access time for the ephemeral message may be set by the message sender. Alternatively, the access time may be a default setting or a setting specified by the recipient. Regardless of the setting technique, the message is transitory.

"MACHINE-READABLE MEDIUM" in this context refers to a component, device, or other tangible media able to store instructions and data temporarily or permanently and may include, but is not limited to, random-access memory (RAM), read-only memory (ROM), buffer memory, flash memory, optical media, magnetic media, cache memory, other types of storage (e.g., Erasable Programmable Read-Only Memory (EEPROM)) and/or any suitable combination thereof. The term "machine-readable medium" should be taken to include a single medium or multiple media (e.g., a centralized or distributed database, or associated caches and servers) able to store instructions. The term "machine-readable medium" shall also be taken to include any medium, or combination of multiple media, that is capable of storing instructions (e.g., code) for execution by a machine, such that the instructions, when executed by one or more processors of the machine, cause the machine to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

"COMPONENT" in this context refers to a device, physical entity, or logic having boundaries defined by function or subroutine calls, branch points. APIs, or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components. A "hardware component" is a tangible unit capable of performing certain operations and may be configured or arranged in a certain physical manner. In various example embodiments, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein.

A hardware component may also be implemented mechanically, electronically, or any suitable combination thereof. For example, a hardware component may include dedicated circuitry or logic that is permanently configured to perform certain operations. A hardware component may be a special-purpose processor, such as a Field-Programmable Gate Array (FPGA) or an ASIC. A hardware component may also include programmable logic or circuitry that is temporarily configured by software to perform certain operations. For example, a hardware component may include software executed by a general-purpose processor or other programmable processor. Once configured by such software, hardware components become specific machines (or specific components of a machine) uniquely tailored to perform the configured functions and are no longer general-purpose processors. It will be appreciated that the decision to implement a hardware component mechanically, in dedicated and permanently configured circuitry, or in temporarily configured circuitry (e.g., configured by software) may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware components are temporarily configured (e.g., programmed), each of the hardware components need not be configured or instantiated at any one instance in time. For example, where a hardware component comprises a general-purpose processor configured by software to become a special-purpose processor, the general-purpose processor may be configured as respectively different special-purpose processors (e.g., comprising different hardware components) at different times. Software accordingly configures a particular processor or processors, for example, to constitute a particular hardware component at one instance of time and to constitute a different hardware component at a different instance of time.

Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In embodiments in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output.

Hardware components may also initiate communications with input or output devices, and can operate on a resource (e.g., a collection of information). The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein. As used herein, "processor-implemented component" refers to a hardware component implemented using one or more processors. Similarly, the methods described herein may be at least partially processor-implemented, with a particular processor or processors being an example of hardware. For example, at least some of the operations of a method may be performed by one or more processors or processor-implemented components. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an API). The performance of certain of the operations may be distributed among the processors, not only residing within a single machine, but deployed across a number of machines. In some example embodiments, the processors or processor-implemented components may be located in a single geographic location (e.g., within a home environment, an office environment, or a server farm). In other example embodiments, the processors or processor-implemented components may be distributed across a number of geographic locations.

"PROCESSOR" in this context refers to any circuit or virtual circuit (a physical circuit emulated by logic executing on an actual processor) that manipulates data values according to control signals (e.g., "commands," "op codes," "machine code,", etc.) and which produces corresponding output signals that are applied to operate a machine. A processor may, for example, be a Central Processing Unit (CPU), a Reduced Instruction Set Computing (RISC) processor, a Complex Instruction Set Computing (CISC) processor, a Graphics Processing Unit (GPU), a Digital Signal Processor (DSP), an ASIC, a Radio-Frequency Integrated Circuit (RFIC) or any combination thereof. A processor may further be a multi-core processor having two or more independent processors (sometimes referred to as "cores") that may execute instructions contemporaneously.

"TIMESTAMP" in this context refers to a sequence of characters or encoded information identifying when a certain event occurred, for example giving date and time of day, sometimes accurate to a small fraction of a second.

Changes and modifications may be made to the disclosed embodiments without departing from the scope of the present disclosure. These and other changes or modifications are intended to be included within the scope of the present disclosure, as expressed in the following claims.

What is claimed is:

1. A method comprising:
receiving, by one or more processors, a monocular image that includes a depiction of a body of a user;
detecting, by the one or more processors, a plurality of skeletal joints of the body depicted in the monocular image;
determining, by the one or more processors, a pose represented by the body depicted in the monocular image based on the detected plurality of skeletal joints of the body;
in response to determining the pose represented by the body of the user, modifying, by the one or more processors, poses of a plurality of avatars from being in different neutral poses to having identical poses that match the pose represented by the body of the user depicted in the monocular image by adjusting a set of skeletal joints of rigs of the avatars based on the detected plurality of skeletal joints of the body; and
generating, for display by the one or more processors, the plurality of avatars having the modified poses that match the pose represented by the body of the user depicted in the monocular image.

2. The method of claim 1, wherein the monocular image is a first frame of a video, further comprising:
identifying a plurality of skeletal joint features of the monocular image using a first machine learning technique, wherein positions of the plurality of skeletal joints are detected based on the identified plurality of skeletal joint features; and
estimating a position of the user and a scale of an image of the user in a second frame of the video that is adjacent to the first frame by processing the first frame of the video using a second machine learning technique.

3. The method of claim 1 further comprising:
predicting a position of the user in a subsequent image that will be received after the monocular image; and
identifying a plurality of skeletal joint positions corresponding to the detected plurality of skeletal joints, wherein the pose represented by the body is determined based on a pose associated with the plurality of skeletal joint positions.

4. The method of claim 1 further comprising generating for display the avatars having the modified poses together with the depiction of the body of the user, wherein a first of the avatars is in a first neutral pose different from a second neutral pose of a second of the avatars, and wherein the first and second avatars transition to having identical poses that mimic the pose represented by the body of the user in response to determining the pose represented by the body of the user.

5. The method of claim 4, wherein the user is a first user and wherein the avatars include a first avatar, further comprising:
capturing a first image that includes the display of the first avatar having the modified pose together with the depiction of the body of the first user; and
sending, from a first user device of the first user, the captured first image to a second user device of a second user.

6. The method of claim 5 further comprising receiving a second image from the second user device, the second image including a simultaneous display of a second avatar and a depiction of a body of the second user, wherein a pose of the second avatar in the second image matches a pose depicted by the body of the second user.

7. The method of claim 6 further comprising generating a simultaneous display of the first and second images.

8. The method of claim 1 further comprising:
receiving a video comprising a plurality of monocular images that include the depiction of the body of the user;
tracking changes in the plurality of skeletal joints across the plurality of monocular images;
detecting changes to the pose represented by the body based on tracking the changes in the plurality of skeletal joints; and
continuously or periodically modifying poses of the avatars to match the changes to the pose represented by the body.

9. The method of claim 8 further comprising:
presenting a virtual object in the video; and
adjusting one or more of a rate at which the virtual object moves, a position of the object in the video, and a visual attribute of the object based on the detected changes to the pose represented by the body.

10. The method of claim 1, wherein the plurality of avatars are a plurality of identical avatars, and wherein the avatars comprise a first avatar, and the method further comprises:
generating, for display by the one or more processors; the plurality of identical avatars having a first set of different poses; and
detecting that the pose represented by the body depicted in the monocular image corresponds to a specified pose.

11. The method of claim 10 further comprising, in response to detecting that the pose represented by the body depicted in the monocular image corresponds to the specified pose:
modifying the first set of different poses of the plurality of avatars to have identical poses that match the pose represented by the body depicted in the monocular image; and
generating, for display by the one or more processors; the plurality of avatars having the identical poses.

12. The method of claim 11 further comprising animating the modification of the first set of different poses of the plurality of avatars in the generated display.

13. The method of claim 1 further comprising causing a given one of the avatars to interact with a virtual object depicted in an image based on the modified pose.

14. The method of claim 1, wherein the detecting and the determining steps are performed without accessing depth information from a depth sensor.

15. The method of claim 1, wherein detecting the plurality of skeletal joints of the body comprises identifying points respectively associated with a right wrist, a right elbow, a right shoulder; a nose on a face of the user, a left shoulder, a left elbow, and a left wrist.

16. The method of claim 1, wherein a rate at which the plurality of skeletal joints is detected is adjusted based on a position of the user relative to an image capture device.

17. A system comprising:
a processor configured to perform operations comprising:
receiving a monocular image that includes a depiction of a body of a user;
detecting a plurality of skeletal joints of the body depicted in the monocular image;
determining a pose represented by the body depicted in the monocular image based on the detected plurality of skeletal joints of the body;

in response to determining the pose represented by the body of the user, modifying poses of a plurality of avatars from being in different neutral poses to having identical poses that match the pose represented by the body of the user depicted in the monocular image by adjusting a set of skeletal joints of rigs of the avatars based on the detected plurality of skeletal joints of the body; and generating, for display, the plurality of avatars having the modified poses that match the pose represented by the body of the user depicted in the monocular image.

18. The system of claim 17, wherein the operations further comprise identifying a plurality of skeletal joint features of the monocular image using a machine learning technique; wherein the plurality of skeletal joints are detected based on the identified plurality of skeletal joint features.

19. A non-transitory machine-readable storage medium that includes instructions that, when executed by one or more processors of a machine, cause the machine to perform operations comprising:

receiving a monocular image that includes a depiction of a body of a user;

detecting a plurality of skeletal joints of the body depicted in the monocular image;

determining a pose represented by the body depicted in the monocular image based on the detected plurality of skeletal joints of the body;

in response to determining the pose represented by the body of the user, modifying poses of a plurality of avatars from being in different neutral poses to having identical poses that match the pose represented by the body of the user depicted in the monocular image by adjusting a set of skeletal joints of rigs of the avatars based on the detected plurality of skeletal joints of the body; and generating, for display, the plurality of avatars having the modified poses that match the pose represented by the body of the user depicted in the monocular image.

* * * * *

UNITED STATES PATENT AND TRADEMARK OFFICE
CERTIFICATE OF CORRECTION

PATENT NO. : 10,984,575 B2  
APPLICATION NO. : 16/269312  
DATED : April 20, 2021  
INVENTOR(S) : Assouline et al.

Page 1 of 1

It is certified that error appears in the above-identified patent and that said Letters Patent is hereby corrected as shown below:

On the Title Page

On page 2, in Column 1, under "U.S. Patent Documents", Line 74, after "Li et al.", insert --¶9,489,661 B2 11/2016 Evans et al.--

On page 2, in Column 2, under "U.S. Patent Documents", Line 68, delete "2010/0162141 A1 6/2010 Koch et al." and insert --2010/0162149 A1 6/2010 Sheleheda et al.-- therefor In the Claims In Column 24, Line 26, in Claim 10, delete "processors;" and insert --processors,-- therefor In Column 24, Line 40, in Claim 11, delete "processors;" and insert --processors,-- therefor In Column 24, Line 54, in Claim 15, delete "shoulder;" and insert --shoulder,-- therefor In Column 25, Line 14, in Claim 18, delete "technique;" and insert --technique,-- therefor Signed and Sealed this  
Twenty-fourth Day of August, 2021

Drew Hirshfeld  
*Performing the Functions and Duties of the*  
*Under Secretary of Commerce for Intellectual Property and*  
*Director of the United States Patent and Trademark Office*